United States Patent
Cahoon et al.

(10) Patent No.: US 11,994,662 B2
(45) Date of Patent: *May 28, 2024

(54) PRINTED SLIDE FOR IDENTIFYING REFERENCE FOCAL PLANE FOR LIGHT MICROSCOPY

(71) Applicant: Techcyte, Inc., Orem, UT (US)

(72) Inventors: Benjamin Cahoon, Orem, UT (US); Shane Swenson, Cottonwood Heights, UT (US); Benjamin S. Larson, Orem, UT (US)

(73) Assignee: Techcyte, Inc., Orem, UT (US)

( * ) Notice: Subject to any disclaimer, the term of this patent is extended or adjusted under 35 U.S.C. 154(b) by 691 days.

This patent is subject to a terminal disclaimer.

(21) Appl. No.: 16/746,633

(22) Filed: Jan. 17, 2020

(65) Prior Publication Data

US 2020/0233200 A1 Jul. 23, 2020

Related U.S. Application Data

(60) Provisional application No. 62/794,487, filed on Jan. 18, 2019, provisional application No. 62/810,850, filed on Feb. 26, 2019.

(51) Int. Cl.
*G02B 21/00* (2006.01)
*G02B 21/24* (2006.01)
(Continued)

(52) U.S. Cl.
CPC ........... *G02B 21/26* (2013.01); *G02B 21/006* (2013.01); *G02B 21/241* (2013.01); *G02B 21/36* (2013.01); *G02B 21/06* (2013.01); *G02B 21/34* (2013.01)

(58) Field of Classification Search
CPC ...... G02B 21/00; G02B 21/006; G02B 21/06; G02B 21/24; G02B 21/241; G02B 21/26;
(Continued)

(56) References Cited

U.S. PATENT DOCUMENTS 7,968,832 B2 * 6/2011 Okuda ................... G01J 3/463
250/201.3
2002/0177184 A1 11/2002 Mielzynska et al.
(Continued)

FOREIGN PATENT DOCUMENTS

JP H09-218932 A 8/1997
JP H11-231228 A 8/1998
(Continued)

OTHER PUBLICATIONS

European Search Report and Written Opinion Received for PCT Application No. PCT/US2020/014167, dated Oct. 12, 2022, 13 Pages.
(Continued)

*Primary Examiner* — Thong Q Nguyen
(74) *Attorney, Agent, or Firm* — TechLaw Ventures, PLLC; Terrence J. Edwards

(57) ABSTRACT

Systems, methods, and devices for identifying a reference focal surface in connection with light microscopy. A method includes identifying a fiducial marker printed on a surface of a coverslip or a slide used in connection with optical microscopy. The method includes focusing the optical microscope on the fiducial marker to calculate a focal distance of the fiducial marker. The method includes calculating a reference focal surface defining the surface of the coverslip or the slide based on the focal distance of the fiducial marker.

20 Claims, 19 Drawing Sheets

(51) Int. Cl.
  *G02B 21/26* (2006.01)
  *G02B 21/36* (2006.01)
  *G02B 21/06* (2006.01)
  *G02B 21/34* (2006.01)
(58) Field of Classification Search
  CPC ........ G02B 21/34; G02B 21/36; G02B 27/32; G02B 27/34; G02B 27/36
  USPC .................................................. 359/368–398
  See application file for complete search history.

(56) References Cited

U.S. PATENT DOCUMENTS

| | | |
|---|---|---|
| 2003/0179445 A1 | 9/2003 | Maenle et al. |
| 2005/0068614 A1 | 3/2005 | Yoneyama et al. |
| 2009/0206234 A1 | 8/2009 | Okuda et al. |
| 2010/0073766 A1* | 3/2010 | Angros ................. G02B 21/34 359/397 |
| 2011/0177548 A1 | 7/2011 | Graham et al. |
| 2013/0147939 A1* | 6/2013 | Nawata ................. G01B 11/26 348/79 |
| 2015/0219979 A1 | 8/2015 | Zhou et al. |
| 2018/0120553 A1 | 5/2018 | Leshem et al. |
| 2018/0149855 A1* | 5/2018 | Chou ..................... G02B 21/26 |
| 2018/0373015 A1* | 12/2018 | Sakamoto ............ G02B 21/368 |
| 2020/0233199 A1* | 7/2020 | Cahoon ................ G02B 21/365 |

FOREIGN PATENT DOCUMENTS

| | | | |
|---|---|---|---|
| JP | 2009-109682 | * | 5/2009 |
| JP | 2013-524291 A | | 6/2013 |
| WO | 2018102147 A1 | | 6/2018 |

OTHER PUBLICATIONS

Machine translation of Japanese Publication No. H09218932.
Machine translation of Japanese Publication No. 2013524291.
Machine translation of Japanese Publication No. H11231228.

* cited by examiner

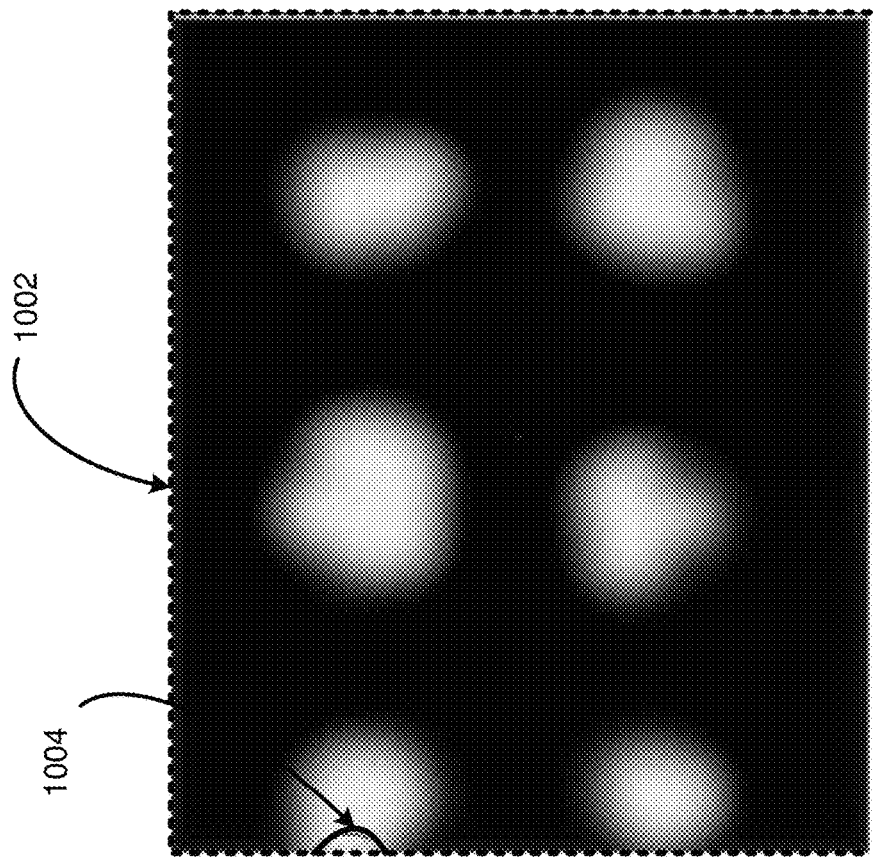
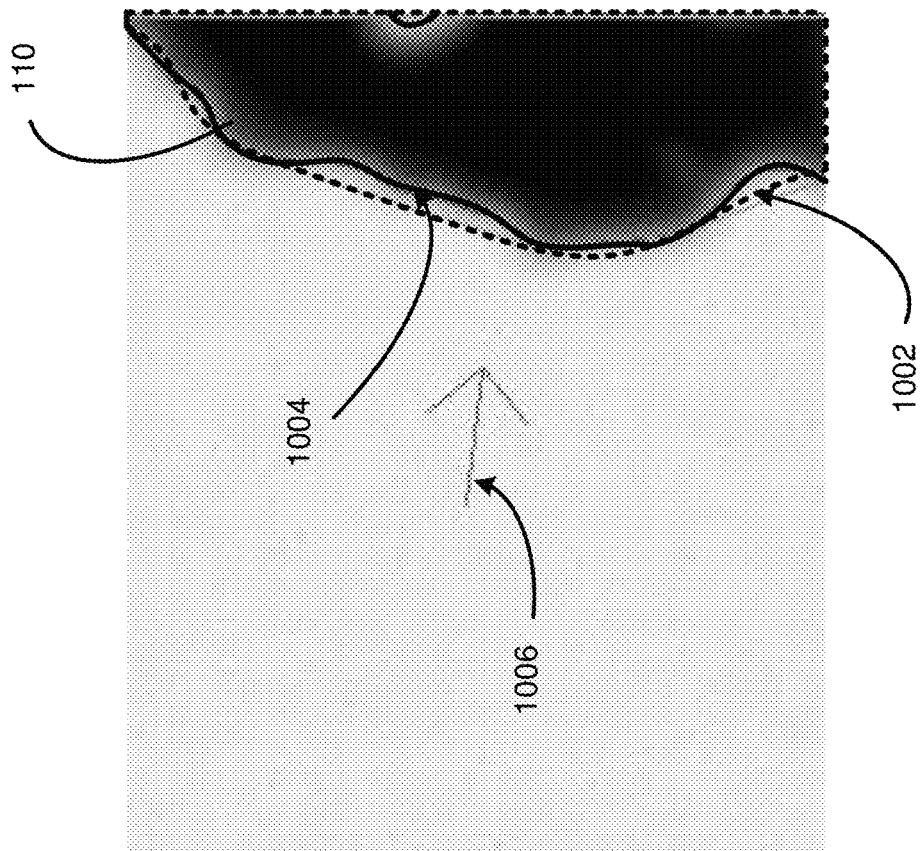
FIG. 10B
FIG. 10A

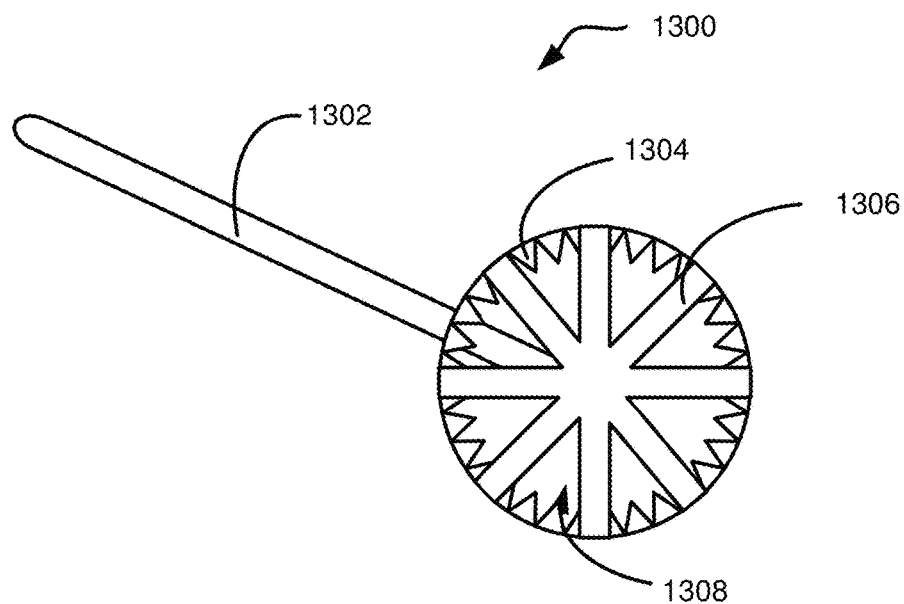
FIG. 13A
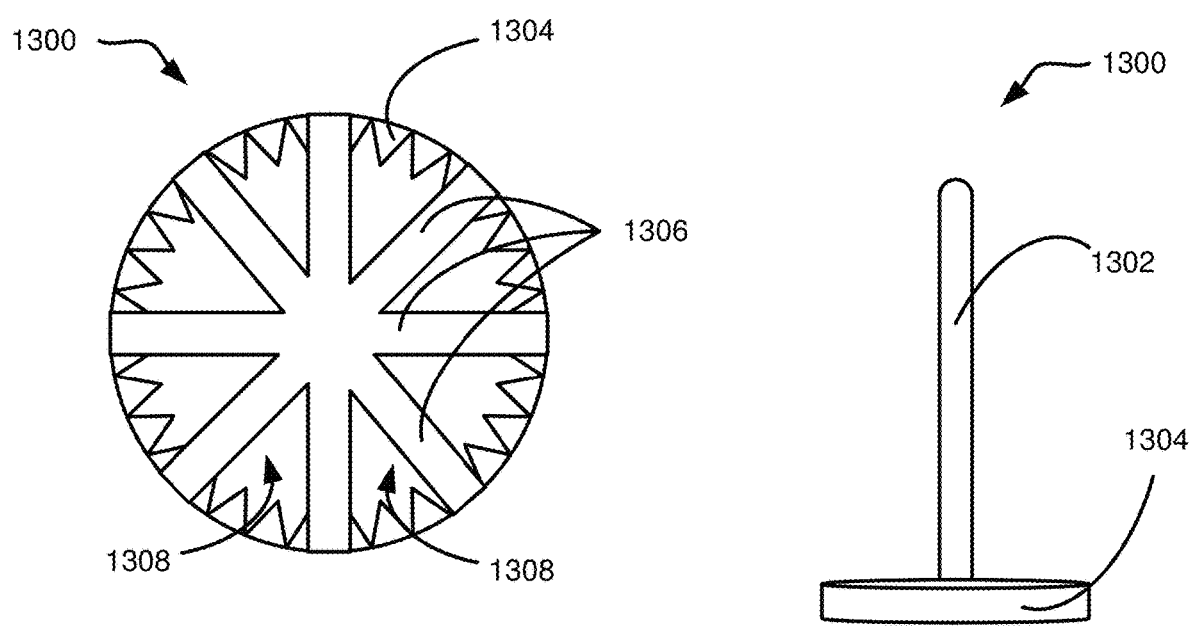
FIG. 13B
FIG. 13C

1400

Identifying A Fiducial Marker Printed On A Surface Of A Coverslip.
1402

Focusing An Optical Microscope On The Fiducial Marker To Calculate A Focal Distance Of The Fiducial Marker.
1404

Calculating A Reference Focal Plane Defining The Surface Of The Coverslip Based At Least In Part On The Focal Distance Of The Fiducial Marker.
1406

FIG. 14

```
                    ┌─────────────────────────────────────────────────┐
                    │  Identifying A Fiducial Marker Printed On A Surface Of A Slide.  │
                    │                        1502                                      │
                    └─────────────────────────────────────────────────┘
                                             │
                                             ▼
                    ┌─────────────────────────────────────────────────┐
                    │  Focusing An Optical Microscope On The Fiducial Marker To Calculate A Focal  │
                    │              Distance Of The Fiducial Marker.                    │
                    │                        1504                                      │
                    └─────────────────────────────────────────────────┘
                                             │
                                             ▼
                    ┌─────────────────────────────────────────────────┐
                    │  Calculating A Reference Focal Plane Defining The Surface Of The Slide Based At  │
                    │     Least In Part On The Focal Distance Of The Fiducial Marker.  │
                    │                        1506                                      │
                    └─────────────────────────────────────────────────┘
```

```
┌─────────────────────────────────────────────────────────────────────┐
│ Identifying A Fiducial Marker Printed On A Coverslip, Wherein The   │
│ Fiducial Marker Is Printed On A Bottom Surface Of The Coverslip     │
│ Relative To An Eyepiece Or Camera Of An Optical Microscope.         │
│                              1602                                    │
└─────────────────────────────────────────────────────────────────────┘
                                 │
                                 ▼
┌─────────────────────────────────────────────────────────────────────┐
│          Focusing The Optical Microscope On The Fiducial Marker.    │
│                              1604                                    │
└─────────────────────────────────────────────────────────────────────┘
                                 │
                                 ▼
┌─────────────────────────────────────────────────────────────────────┐
│ Calculating A Reference Focal Plane Defining The Bottom Surface Of  │
│ The Coverslip Based On A Location Of The Fiducial Marker.           │
│                              1606                                    │
└─────────────────────────────────────────────────────────────────────┘
```

Identifying A Fiducial Marker Printed On A Slide, Wherein The Fiducial Marker Is Printed On A Top Surface Of The Slide Relative To An Eyepiece Or Camera Of An Optical Microscope.
1702

Focusing The Optical Microscope On The Fiducial Marker.
1704

Calculating A Reference Focal Plane Defining The Top Surface Of The Slide Based On A Location Of The Fiducial Marker.
1706

FIG. 17

```
┌─────────────────────────────────────────────────────────────────────────┐
│ Identifying A Fiducial Marker Printed On A Surface Of A Coverslip Or A  │
│                            Surface Of A Slide.                          │
│                                  1802                                   │
└─────────────────────────────────────────────────────────────────────────┘
                                     │
                                     ▼
┌─────────────────────────────────────────────────────────────────────────┐
│  Focusing The Optical Microscope On The Fiducial Marker To Calculate    │
│               A Focal Distance Of The Fiducial Marker.                  │
│                                  1804                                   │
└─────────────────────────────────────────────────────────────────────────┘
                                     │
                                     ▼
┌─────────────────────────────────────────────────────────────────────────┐
│ Calculating A Reference Focal Plane Defining Either Of The Surface Of   │
│ The Coverslip Or The Surface Of The Slide Based On The Focal Distance   │
│                         Of The Fiducial Marker.                         │
│                                  1806                                   │
└─────────────────────────────────────────────────────────────────────────┘
```

```
┌─────────────────────────────────────────────────────────────────────────┐
│ Focusing An Optical Microscope On Each Of A Plurality Of Fiducial Markers Printed │
│ On A Surface Of A Coverslip Or A Slide To Calculate A Focal Distance For Each Of │
│              The Plurality Of Fiducial Markers.                         │
│                              1902                                       │
└─────────────────────────────────────────────────────────────────────────┘
                                    │
                                    ▼
┌─────────────────────────────────────────────────────────────────────────┐
│ Matching The Focal Distance For Each Of The Plurality Of Fiducial Markers With A │
│        Corresponding Location For Each Of The Plurality Of Fiducial Markers.    │
│                              1904                                       │
└─────────────────────────────────────────────────────────────────────────┘
                                    │
                                    ▼
┌─────────────────────────────────────────────────────────────────────────┐
│ Calculating A Reference Focal Plane For The Coverslip Or The Slide Based On The │
│  Corresponding Focal Distance And Location Of Each Of The Plurality Of Fiducial │
│                              Markers.                                   │
│                              1906                                       │
└─────────────────────────────────────────────────────────────────────────┘
```

FIG. 19

PRINTED SLIDE FOR IDENTIFYING REFERENCE FOCAL PLANE FOR LIGHT MICROSCOPY

CROSS-REFERENCE TO RELATED APPLICATIONS

This application claims the benefit of U.S. Provisional Patent Application No. 62/794,487, filed Jan. 18, 2019, titled "SYSTEMS, APPARATUS AND METHODS FOR DETERMINING REFERENCE FOCAL PLANES FOR SLIDE SCANNING," and further claims the benefit of U.S. Provisional Patent Application No. 62/810,850, filed Feb. 26, 2019, titled "SYSTEMS, APPARATUS AND METHODS FOR DETERMINING REFERENCE FOCAL PLANES FOR SLIDE SCANNING," which are incorporated herein by reference in their entirety, including but not limited to those portions that specifically appear hereinafter, the incorporation by reference being made with the following exception: In the event that any portion of the above-referenced provisional applications are inconsistent with this application, this application supersedes the above-referenced provisional applications.

TECHNICAL FIELD

The present disclosure relates to light microscopy and particularly relates to reference focal surfaces for use with light microscopy.

BACKGROUND

Light microscopy uses visible light and a system of lenses to magnify images or small objects. Light microscopy can be performed using an optical microscope. Optical microscopes typically include an eyepiece and/or camera for viewing objects. When a user views an object through the eyepiece, the user can manually change the focus of the microscope when viewing different portions of the object. Further, when object analysis is performed by a computer program in communication with the camera, the computer program may repeatedly change the focus of the microscope when viewing different portions of the object. However, this need to repeatedly change the focus of the microscope can lead to errors in analysis when performed by a human or a computer program.

Optical microscopes are commonly used to view a sample of material. The sample may include organic matter such as bacteria or small organisms and may include inorganic matter such as crystalline structures or other materials. When the sample is thicker than the optical depth of field, the user or computer program may need to repeatedly adjust the focal depth of the microscope to view different regions of the sample. In some instances, in an effort to ensure the sample is evenly distributed on a slide, a coverslip is placed on top of the sample such that the sample is sandwiched between the slide and the coverslip.

Ideally, the coverslips and slides used for light microscopy are smooth, flat, and have a uniform thickness. However, coverslips and slides often deviate from this ideal. In many cases, coverslips and slides have a bowing curvature or a non-uniform thickness. In some implementations, the sample consists of a fluid or malleable medium that may have been placed on the slide by hand or other imprecise means. In such an implementation, when the coverslip is placed on top of the sample, the shape and thickness of the sample sandwiched between the slide and the coverslip may change or vary across sample. This variance can be caused by the curvature, tilt, variation in thickness, or surface imperfections of the slide or the coverslip. The variance causes an uneven distribution of the sample and therefore necessitates that the focus of the microscope is repeatedly changed as a person or computer program view different portions of the sample.

In light of the foregoing, disclosed herein are systems, methods, and devices for reference frames for light microscopy. The reference frames disclosed herein compensate for variances in slides, coverslips, and samples and therefore improve microscopy imaging.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. It will be appreciated by those of ordinary skill in the art that the various drawings are for illustrative purposes only. The nature of the present disclosure, as well as other embodiments in accordance with this disclosure, may be more clearly understood by reference to the following detailed description, to the appended claims, and to the several drawings.

FIG. 10A is an example 10× magnification high-resolution image created by an automated slide scanner used in conjunction with a printed coverslip and/or printed slide for comparing a predicted edge of a fiducial marker with the captured edge of the fiducial marker;

FIG. 10B is an example 10× magnification high-resolution image created by an automated slide scanner used in conjunction with a printed coverslip and/or printed slide for determining that the present field of view is wholly contained within a fiducial marker;

FIG. 13A is a perspective side view of an embodiment of a sample transfer tool having a plurality of sample capture loops;

FIG. 13B is a straight-on aerial view of an embodiment of a sample transfer tool having a plurality of sample capture loops;

FIG. 13C is a straight-on side view of an embodiment of a sample transfer tool having a plurality of sample capture loops;

FIG. 14 is a schematic flow chart diagram of a method for focusing an optical microscope on a sample using a fiducial marker printed on a surface of a coverslip;

FIG. 15 is a schematic flow chart diagram of a method for focusing an optical microscope on a sample using a fiducial marker printed on a surface of a slide;

FIG. 16 is a schematic flow chart diagram of a method for focusing an optical microscope on a sample using a fiducial marker printed on a bottom surface of a coverslip;

FIG. 17 is a schematic flow chart diagram of a method for focusing an optical microscope on a sample using a fiducial marker printed on a top surface of a slide;

FIG. 18 is a schematic flow chart diagram of a method for focusing an optical microscope on a sample using a fiducial marker printed on either a surface of a coverslip or a surface of a slide; and FIG. 19 is a schematic flow chart diagram of a method for calculating a reference focal surface for a sample based on a plurality of fiducial markers.

DETAILED DESCRIPTION

Figure 1:
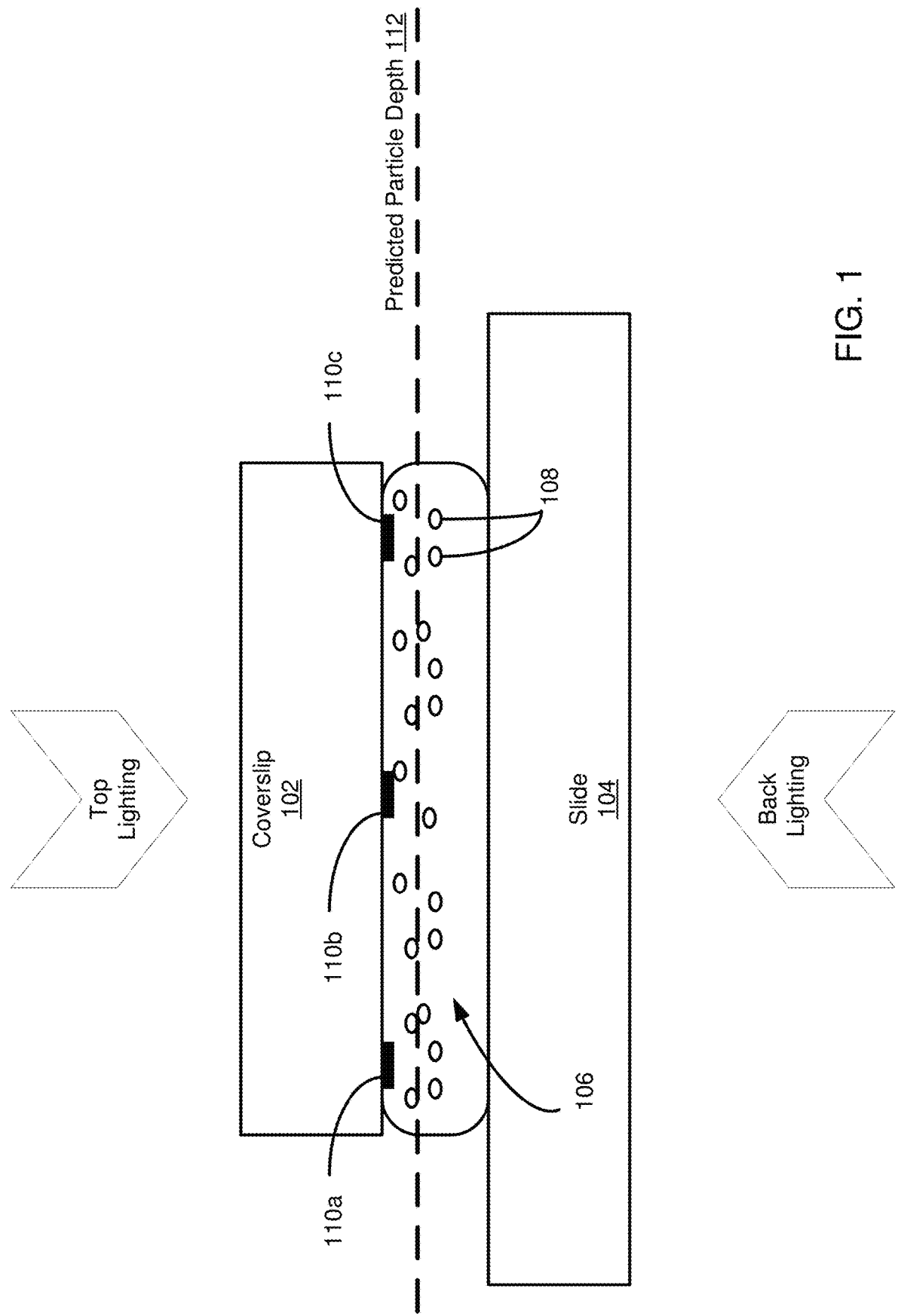
FIG. 1 illustrates a conceptual side-view diagram of a printed coverslip being used to provide a reference focal surface at the bottom surface of the coverslip so that a slide scanner can scan the sample at one or more specified offsets below the surface of the coverslip.

Disclosed herein are systems, methods, and devices for determining reference focal surfaces for refining the focus of a sample viewed with light microscopy. Some embodiments of the disclosure are directed to printed coverslips and printed slides for efficiently identifying a reference focal surface of a sample being imaged by light microscopy. The reference frames compensate for variances in the sample thickness as well as curvature, thickness, or surface smoothness of slides and coverslips.

An embodiment of the disclosure uses fiducial markers to identify the reference focal surface of a sample being imaged by light microscopy. In an embodiment, the fiducial markers are printed on a coverslip and/or a slide for use with an optical microscope. The reference focal surface, or a specified offset from the reference focal surface, can be used as a starting point to further refine the focus surface of the sample. In an embodiment, the focus is further refined based on images of the sample at a certain location. The location of the images relative to the entire sample is determined based on the fiducial markers.

An embodiment of the disclosure is applied to light microscopy when a sample is difficult to focus. In the implementation, a sample is sandwiched between a slide and a coverslip. One or more of the slide or the coverslip has been printed to include fiducial markers. The sample is scanned with an optical microscope. The fiducial markers are scanned and assessed to define a reference focal surface for the sample defined as the bottom surface of the coverslip and/or the top surface of the slide. The sample is then scanned at fixed offsets relative to the reference focal surface. In some instances, there is no meaningful means to focus on the sample itself or to determine how to improve focus of the sample from a given reference location. In such instances, this example implementation is particularly useful for refining focus of a sample and for hastening the time to achieve an adequate focus.

A further embodiment of the disclosure is a printed coverslip for scanning air quality samples. In such an implementation, the sample is collected by capturing airborne particulates on the surface of a transparent gel. The sample is stained and covered with the printed coverslip such that the captured particulate layer is very close to the coverslip. In some instances, the captured particulate layer is separated only by a layer of liquid stain ranging from 0-10 μm. In the embodiment, the printed area of the coverslip surrounds the sample but does not overlap the sample itself. A system views the sample through the printed coverslip and focuses on the fiducial markers printed on the coverslip. After focusing on a fiducial marker, the focus position of the sample is estimated using interpolation. These estimates may be imperfect due to the variable stain layer depth and the imperfect flatness of the sample and the printed coverslip. The initial estimates are refined by performing a local focus search at different focal lengths near the estimated focal length. The optimal focus point is thereby identified without becoming confused by confounding layers of high focus measure such as debris on top of the coverslip or on the slide surface under the sample. This implementation is particularly effective for quickly and accurately finding the correct focal point for air quality samples because air quality samples can be sparse when the sampled air has low particulate count.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

FIG. 1 is a conceptual side view diagram of a sample 106 sandwiched between a slide 104 and a coverslip 102 for imaging with an optical microscope. The coverslip 102 serves as a reference focal surface for viewing objects distributed throughout the sample 106. In a typical light microscopy analysis, the sample 106 is processed such that it can be visually examined with an optical microscope to identify, analyze, and/or quantify particles 108 of interest as shown in FIG. 1. The coverslip 102 includes markings to provide a reference focal surface such that a slide scanner may scan the sample 106 at one or more specified offsets below the surface of the coverslip 102.

Figure 2A:
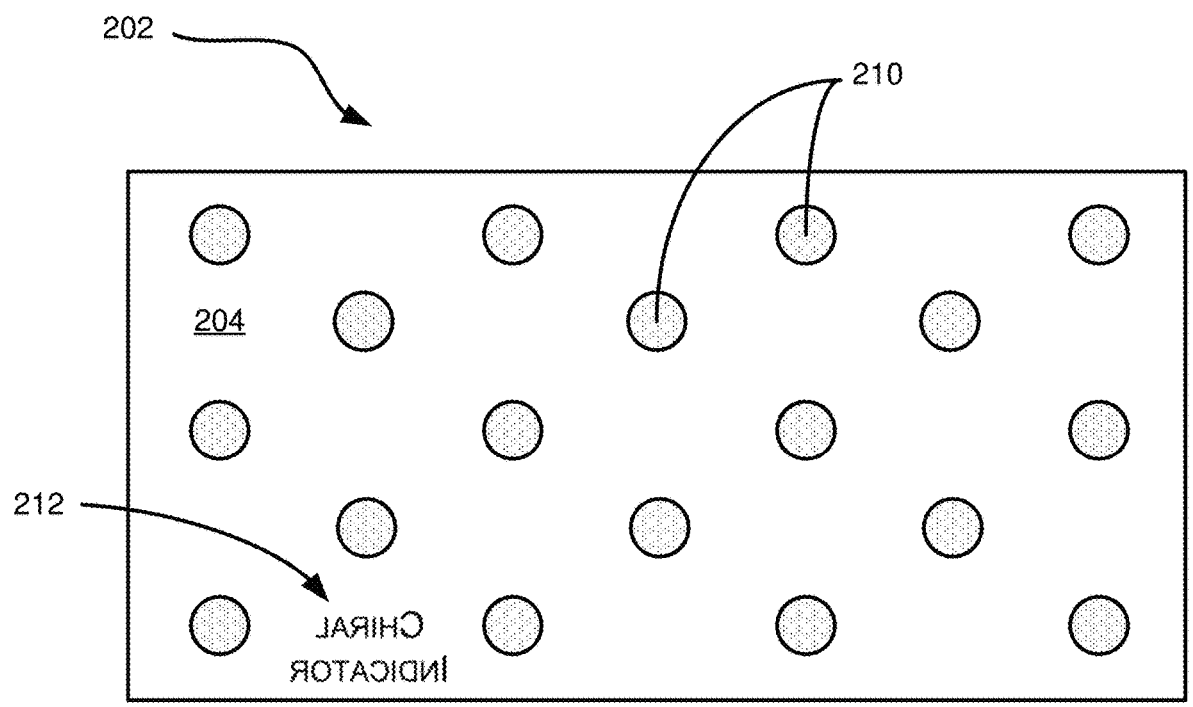
FIG. 2A is an aerial view of a bottom surface of a printed coverslip including a plurality of fiducial markers.
Figure 2B:
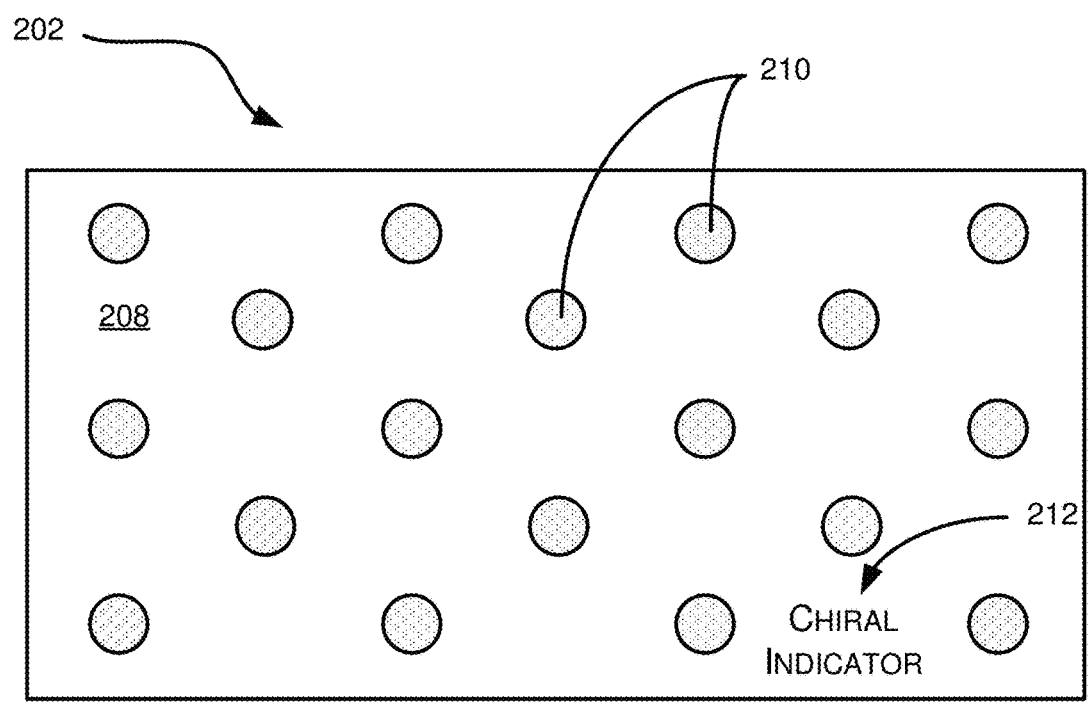
FIG. 2B is an aerial view of a printed coverslip as viewed through the top surface.

The coverslip 102 includes one or more fiducial markers 110a, 110b, 110c (collectively referred to as "110" herein). The fiducial markers 110 are printed on the coverslip. In an embodiment, the fiducial markers 110 are printed only on the bottom surface of the coverslip 102 relative to the eyepiece or camera, i.e. printed on the surface that comes in contact with the sample 106. In an embodiment, the fiducial markers 110 are printed across the area of the coverslip 102 as illustrated in FIGS. 2A-2B. The fiducial markers 110 simplify the process of accurately and efficiently focusing the optical microscope on the sample 106 and/or a particle 108 within the sample 106. The fiducial markers 110 enable a person or computer program to first focus on a fiducial marker 110 to identify the location of the bottom surface of the coverslip 102 and thereby identify the location of the top surface of the sample 106.

In an embodiment, each fiducial marker 110 is a shape of suitable size to be visible when viewed in a macro camera image and/or through an eyepiece of an optical microscope. Further, each fiducial marker 110 may be printed such that the fiducial marker 110 presents internal fine-grained contrast when bottom-lit to facilitate image-based focusing. In such an embodiment, each fiducial marker 110 may be composed of a pattern or texture with fine-grained spatially variable transmittance. The fiducial markers 110 may have a dot pattern, a hashing pattern, a pattern with parallel lines, a randomized pattern, and so forth.

In an embodiment, a sample 106 is disposed on a slide 104 with a coverslip 102 thereon. The sample 106 is backlit by the optical microscope (or another device) through the slide 104. The sample 106 is top-lit by the optical microscope (or another device) through the coverslip 102. A suitable scanning system may take a macro image of the entire coverslip 102, thereby visualizing all fiducial markers 110 in pattern at a macro level. A 40X (or other suitable magnification) view of a portion of the sample 106 may then be taken through the coverslip 102. Where a portion of a fiducial marker 110 is visible, the view may be focused to see the transition on the pattern of the fiducial marker 110, as for example on the grid pattern fiducial markers illustrated in FIGS. 2A-2B.

In an embodiment, the coverslip 102 defines the focus plane for the lower surface of the coverslip 102 that contacts the sample 106. This is accomplished by focusing on the transition area and specifically focusing on the edge of void to ink area of the fiducial markers 110. Once three fiducial markers 110 can be visualized, a system can define a base plane corresponding to the lower surface of the coverslip 102 to serve as a reference focal surface. As additional fiducial markers 110 are focused, the model used for the defined base plane can be expanded to reflect the shape of the bottom surface of the coverslip 102. It will be appreciated that suitable software and mathematical calculations for determining the base plane may be used and may be integrated as part of the function of a machine learning or automated slide scanning system.

In an embodiment, the sample 106 is visualized and assessed using an automated slide scanner. The automated slide scanner scans the sample 106 using a range of motion along a generally vertical or z-axis to scan along one or more defined focal surfaces. The defined focal surfaces are generally parallel to the defined base plane corresponding to the lower surface of the coverslip 102. If the particles 108 of interest reside within a predicted particle depth 112 (defined as a depth from the base focal surface), then defined planes within the predicted particle depth 112 band may be scanned. In an example, the predicted particle depth 112 band is from 3 microns to 12 microns depth from the base focal surface (defined as the lower surface of the coverslip 102). The scans may occur at 3 microns depth, 5 microns depth, 7 microns depth, 9 microns depth, 11 microns depth, 13 microns depth, and 15 microns depths, or at any other suitable range as determined on a case-by-case basis. It should be appreciated that these values are merely illustrative and will vary based on the properties of the media and the particles of interest for various applications.

In other embodiments where particles 108 of interest may reside in a band closer to the lower end of the sample 106 near the slide 104, the fiducial markers 110 could be placed on the upper surface of the slide 104 rather than placed on the lower surface of the coverslip 102. As with the fiducial markers 110 on the coverslips 102, these fiducial markers 110 could be placed by printing directly on the slide 104. In some embodiments, differing fiducial markers 110 could be present on both the slide 104 and the coverslip 102. This would allow for the use of the technique using both upper and lower focal surfaces and for the analysis of particles 108 of interest based on either sedimentation or floatation properties.

The coverslip 102 may be a suitable size and shape for use with an optical microscope slide. In an embodiment, the coverslip 102 has a size of about 22 mm×22 mm. In an embodiment, the coverslip 102 has a size of about 20 mm×40 mm. It should be appreciated that the coverslip 102 may have a size and shape customized for a particular application, such as for a particular macro camera or optical microscope.

In some implementations, the sample 106 is prepared in a liquid form. In one example, the sample is fecal material such as a stool sample collected from an animal. In the example, the sample 106 is prepared by mixing the fecal material with reagents, filtering to remove large contaminants, and performing centrifugation. The prepared sample 106 may then be examined for presence of a particle 108 of interest. In the example, the animal may be suspected of having a parasitic condition, and the fecal material may be examined to identify the presence of particles 108 such as ova, parasites, or debris. The sample processing may cause a particle 108 of interest such as parasitic ova to reside at a particular height within the sample 106 due to specific gravity or similar properties. In some instances, there is a known predicted particle depth 112 where the particle 108 of interest is expected to reside within the sample 106. In the example embodiment, the ova might reside at a depth of from about 3 microns to about 12 microns below an upper surface of the sample 106. If the coverslip 102 has a curvature or other variance, this may cause the actual depth of the particle 108 of interest to vary. In such an instance, an automated standard focus to the predicted particle depth 112 will not locate the particle 108 of interest. This issue is overcome by first focusing on the fiducial marker 110 to identify the location of the bottom surface of the coverslip 102 and thereby identify the location of the top surface of the sample 106. Based on the identified depth of the fiducial marker 110, the particles 108 can be identified by focusing to the predicted particle depth 112 as determined based on the depth of the fiducial marker 110.

A particle 108 as discussed herein includes any unit or portion of material such as dust, cells, groups of cells, fibers, portions of material, organisms, tissue, biological matter, minerals, or any other item or material that may be classified or analyzed. The classification, detection, quantification, or identification of particles 108 may include identifying a specific type of particle or condition of a specific particle or material. For example, cells may not only be identified as a specific cell type, but also as having or displaying a certain condition, such as a condition that corresponds to an abnormality, disease, infection, or cancer.

FIGS. 2A and 2B illustrate aerial views of a coverslip 202. FIG. 2A illustrates an aerial view of the bottom surface 204 of the coverslip 202, and FIG. 2B illustrates an aerial view of the top surface 208 of the coverslip 202. The coverslip 202 may be constructed of a transparent material such as glass or plexiglass such that markings on the coverslip 202 can be seen on either of the bottom surface 204 or the top surface 208. The bottom surface 204 refers to the lower surface relative to a camera or eyepiece of an optical microscope. The bottom surface 204 is the surface that comes in contact with a sample 106.

The coverslip 202 includes a plurality of fiducial markers 210 printed on the bottom surface 204 and visible when viewing the coverslip through the top surface 208. In the embodiment illustrated in FIGS. 2A-2B, each fiducial marker 210 is a circle of suitable diameter to be visible when top-lit in an overview macro camera image. Additionally, each fiducial marker 210 presents internal fine-grained contrast to facilitate image-based focusing when bottom-lit and viewed through the objective of an optical microscope using an eyepiece or camera. In an embodiment, each fiducial marker 210 is composed of a pattern and/or texture with fine-grained spatially variable transmittance. In one illustrative embodiment, each fiducial marker 210 is a circle within a range of approximately 250 µm to 1.4 mm diameter. It should be appreciated that the fiducial markers 210 may be of any suitable size and shape depending on the application of the coverslip 202.

The coverslip 202 further includes a chiral indicator 212 printed on the bottom surface 204. The chiral indicator 212 is chiral such that the words or symbols have a correct orientation. The chiral nature of the chiral indicator 212 guides a user in orienting the coverslip 202 with the correct orientation and with the correct side facing up. In the example illustrated in FIGS. 2A-2B, the chiral indicator 212 is the words "CHIRAL INDICATOR," and clearly has a correct orientation. The chiral indicator 212 is printed as a mirror image on the bottom surface 204 of the coverslip 202 such that the chiral indicator 212 can be viewed in the correct orientation when viewed through the upper surface 208 of the coverslip 202. This ensures that a practitioner orients the coverslip 202 correctly such that the bottom surface 202 is in contact with the sample 106. The chiral nature of the chiral indicator 212 further enables a reviewing person or computer program to verify that the coverslip has the correct orientation through examination of the macro image or high magnification images. It should be appreciated that the chiral indicator 212 may include text as illustrated in FIGS. 2A-2B, or it may include a symbol or shape. The chiral indicator 212 may be a geometric shape, written text, a series of lines, a pattern, and so forth.

In an embodiment, the fiducial markers 210 present high-contrast sharp-edged spatial variability within a 500 µm×500 µm field of view with 1.0 µm/pixel resolution when backlit. The fiducial markers 210 further present multiple dark-light transitions across the entirety of the field of view. To achieve this, the spatial variance may have a fine-feature size of less than 200 µm and as fine as 1 µm diameter, with finer structure or texture preferred. Multi-frequency textures and patterns may be used to minimize interference artifacts when defocused, in comparison to single- or few-frequency patterns. In some embodiments, this may be achieved in a number of ways, including pigment structure in ink, explicit structure in printed image design, or implicit structure via fine screen printing, and under-inking. This could also be achieved by etching, laser printing, offset printing, stamping, ink jets, photolithography, 3D printing or any other viable marking mechanism. One ideal distance for transition from light to dark along fine feature edges may be less than 1 µm. The fiducial marker 210 texture and/or structure may be statistically invariant with respect to rotation in 90-degree increments, or to any degree of rotation.

As each coverslip 202 is expected to be floating with the printed side in contact with a solution of the sample 106 of interest, the printed fiducial markers 210 must be formed of a material stable in this environment. Screen printing on the lower surface may be suitable. It will be appreciated that the printing does not need to be precise, and coarse features can tolerate spatial variance, so long as the fine detail is statistically consistent. In practice, a stable pigmented ink can provide acceptable results as it has statistically consistent rotationally-invariant high-contrast fine-grained structure when backlit.

In some embodiments, one or more fiducial markers 210 and a chiral indicator 212 are printed on the slide 104. The slide 104 may include fiducial markers 210 in addition to the coverslip 202. In some embodiments, the slide 104 includes fiducial markers 210 in lieu of any fiducial markers 210 being printed on the coverslip 202. This may be determined based on the type of sample 106 being imaged and/or the particles 108 of interest that might be present within the sample 106. For example, if the expected location of the particles 108 for the given sample type and preparation method is located near the coverslip, then a printed coverslip is best. Alternatively, if the expected location of the particles 108 for the given sample type and preparation method is located near the slide, then a printed slide is best. Further, this may be determined based on whether the sample 106 is illuminated with back lighting through the slide 104 and/or top lighting through the coverslip 102.

In an embodiment where fiducial markers 210 are printed on a slide 104, the slide 104 may look similar to the coverslip 202 illustrated in FIGS. 2A and 2B. One difference is that the fiducial markers 210 are printed on the top surface of a slide as opposed to being printed on the bottom surface of a coverslip. Further, the chiral indicator 212 is printed on the top surface of the slide and is not printed as a mirrored image but is instead printed in the correct, readable form.

Figure 3A:
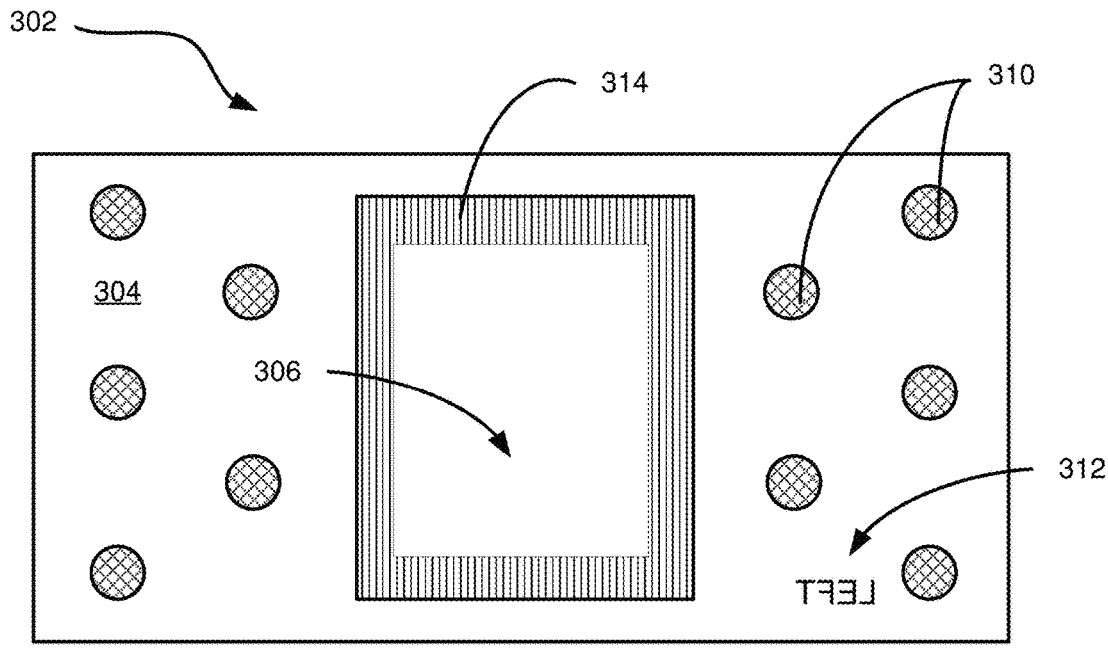
FIG. 3A is an aerial view of a bottom surface of a printed coverslip including a plurality of fiducial markers and a focal frame.
Figure 3B:
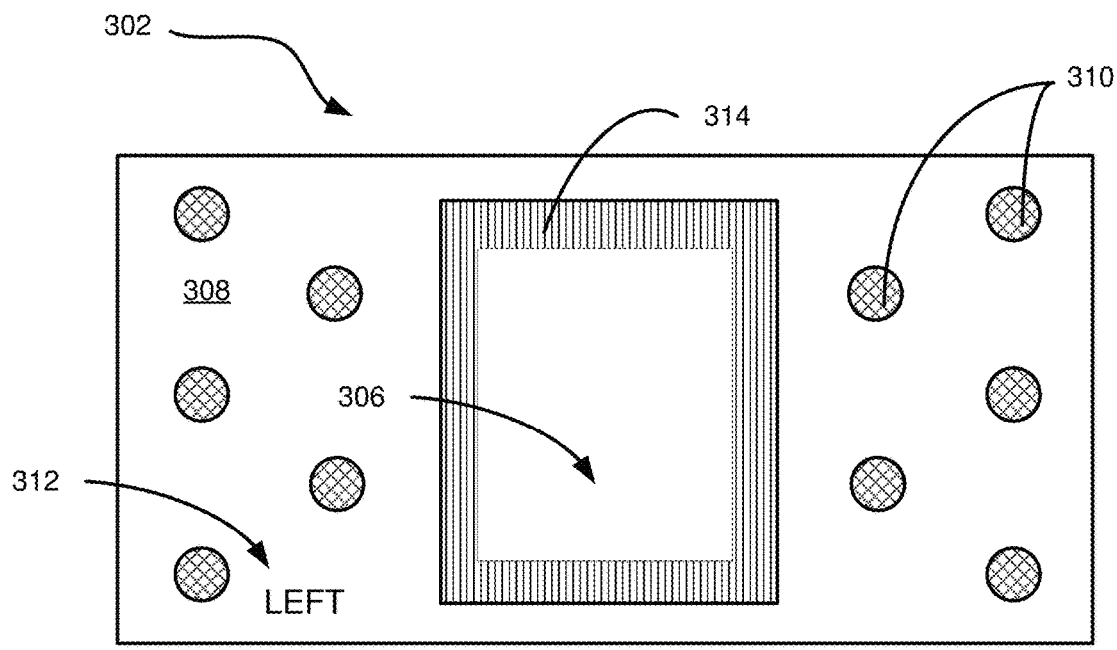
FIG. 3B is an aerial view of a printed coverslip as viewed through the top surface.

FIGS. 3A and 3B illustrate an embodiment of a coverslip 302 with similarities to the coverslip 202 illustrated in FIGS. 2A and 2B. FIG. 3A is an aerial view of the bottom surface 304 of the coverslip 302, wherein the bottom surface 304 is defined relative to a camera or eyepiece of a microscope and is intended to come in contact with the sample 306. FIG. 3B is an aerial view of the top surface 308 of the coverslip 302, wherein the top surface 308 is defined relative to a camera or eyepiece of a microscope and is intended to face the opposite direction of the sample 306. The coverslip 302 includes a plurality of fiducial markers 310 and a chiral indicator 312. Additionally, the coverslip 302 includes a focus frame 314 that may be printed on the coverslip 302 to define where the sample 306 is located or should be viewed.

In the embodiment illustrated in FIGS. 3A-3B, there are ten printed fiducial markers 310. It should be appreciated that the fiducial markers 310 may be any suitable size or shape. In the embodiment illustrated in FIGS. 3A-3B, the fiducial markers 310 are each a circle of suitable diameter that includes a grid pattern to be visible when top-lit in a macro camera image. Additionally, the fiducial markers 310 present internal fine-grained contrast to a 40× objective when bottom-lit to facilitate image-based focusing.

The coverslip 302 further includes a chiral indicator 312. In this embodiment, the chiral indicator 312 is the word "LEFT" printed on the bottom surface 304. The chiral indicator 312 is chiral such that the chiral indicator 312 assists a user in correctly orienting the coverslip 302. The word LEFT is printed as a mirror image on the bottom surface 304 of the coverslip 302 such that the word can be read correctly when viewed through the top surface 308 as shown in FIG. 3B. The word LEFT indicates that the coverslip 302 is oriented correctly when the word can be read correctly (as in FIG. 3B, wherein the top surface 308 is facing upward), and the word LEFT is on the left-hand side of the coverslip 302 when viewed from above through a camera or eyepiece of a microscope.

The coverslip 302 further includes a focus frame 314. The focus frame may be located at a central location of the coverslip 302 or may be located at some other suitable location on the coverslip, depending on the application. The focus frame 314 serves as a bounding box for imaging purposes. As depicted, the focus frame 314 may be formed as a series of parallel lines that define a shape having a central space or window that is free of lines for positioning over a sample 306. In the depicted embodiment, the shape is a rectangle with two longer parallel sides that are colinear with the parallel lines and two shorter sides that are transverse thereto. In addition to the fiducial markers 310, the lines of the focus frame 314 can be used to create a series of focus points at any number of positions in the focus frame 314 around the sample 306 for calculation of the focus plane. It will be appreciated that the focus frame 314 may be any suitable shape and may be formed from lines, dots, or other information that may or may not be parallel to act as a bounding box for purposes of imaging the sample 306.

One potential usage for an embodiment similar to that of FIGS. 3A-3B is the examination of an air quality sample made by directing a stream of air over a strip of suitable material that captures any particles therein to produce a sample 306 strip that can then be examined by microscopy. In one illustrative embodiment, this sample 306 strip may have dimensions of about 1 mm by about 13 mm. The surrounding focus frame 314 may have dimensions of about 7.5 mm by about 19 mm with the central space having dimensions of about 5 mm by about 17 mm. It will be appreciated that these shapes and dimensions are merely illustrative and may vary as particular sample sizes vary for differing assays. For example, tests that produce samples of other standard sizes and shapes may utilize coverslips with focus frames 314 that have sizes and shapes to form suitable frames spaced out from such samples.

In some embodiments, one or more fiducial markers 310 and a chiral indicator 312 are printed on a slide 104 as seen in FIG. 1. The slide 104 may include fiducial markers 310 in addition to the coverslip 302. In some embodiments, the slide 104 includes fiducial markers 310 in lieu of any fiducial markers 310 being printed on the coverslip 302. This may be determined based on the type of sample 106 (as seen in FIG. 1) being imaged and/or the particles 108 (as seen in FIG. 1) of interest that might be present within the sample 106. For example, if the expected location of the particles 108 for the given sample type and preparation method is located near the coverslip, then a printed coverslip is best. Alternatively, if the expected location of the particles 108 for the given sample type and preparation method is located near the slide, then a printed slide is best. Further, this may be determined based on whether the sample 106 is illuminated with back lighting through the slide 104 and/or top lighting through the coverslip 302.

In an embodiment where fiducial markers 310 are printed on a slide 104, the slide 104 may look similar to the coverslip 302 illustrated in FIGS. 3A and 3B. One difference is that the fiducial markers 310 are printed on the top surface of a slide as opposed to being printed on the bottom surface of a coverslip. Further, the chiral indicator 312 is printed on the top surface of the slide and is not printed as a mirrored image but is instead printed in the correct, readable form.

Figure 4:
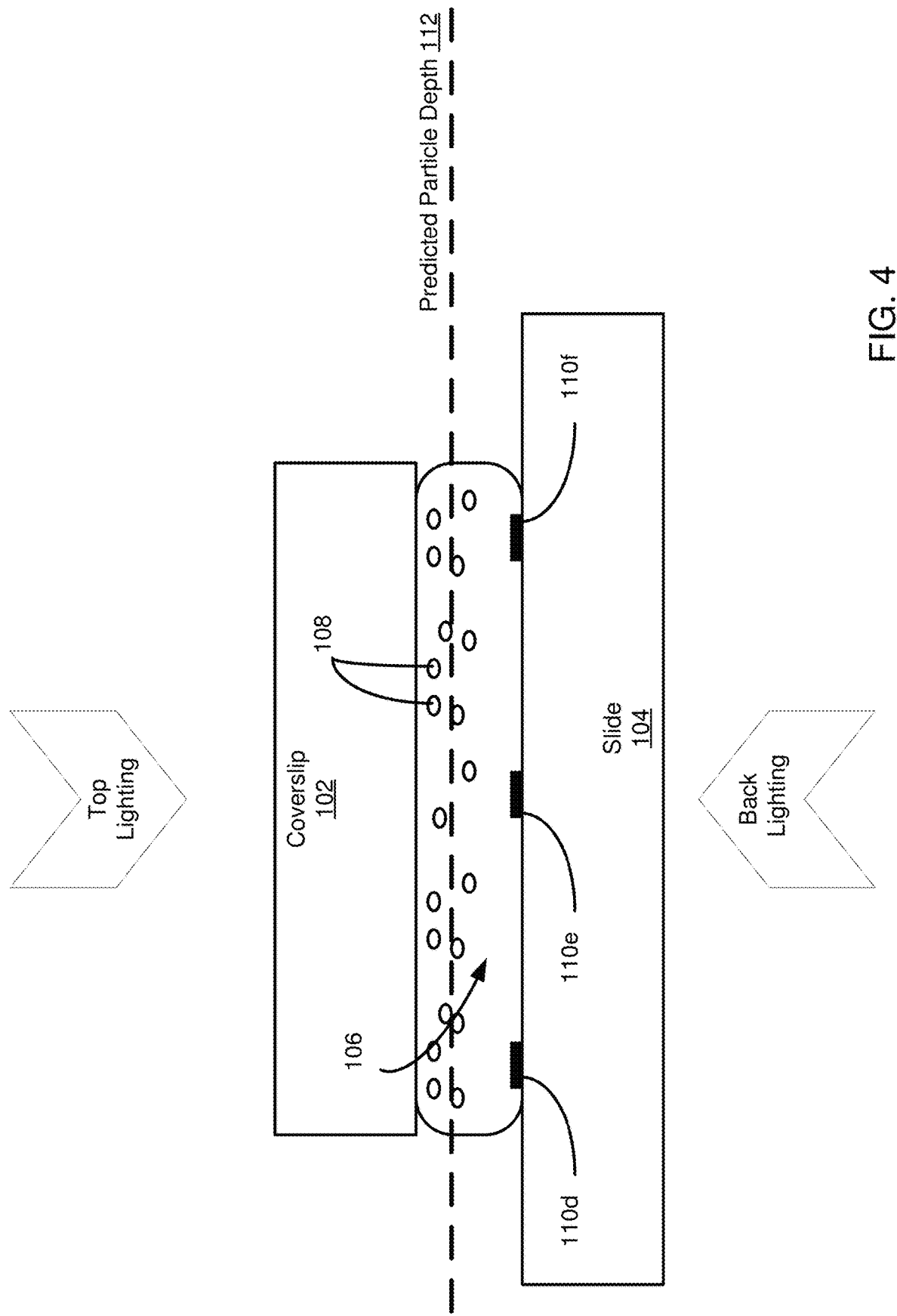
FIG. 4 illustrates a conceptual side-view diagram of a printed slide being used to provide a reference focal surface at the top surface of the slide so that a slide scanner can scan the sample at one or more specified offsets above the surface of the slide.

FIG. 4 is a conceptual side view diagram of a sample 106 sandwiched between a slide 104 and a coverslip 102 for imaging with an optical microscope. In the embodiment illustrated in FIG. 4, the fiducial markers 110 are printed on the top surface of the slide 104 rather than the bottom surface of the coverslip 102 as illustrated in FIG. 1. The slide 104 is printed such that a reference focal surface can be determined based at least in part on the fiducial markers 110d, 110e, 110f (collectively referred to as "110") printed on the slide 104. The slide 104 includes the fiducial markers 110 to provide a reference focal surface such that a slide scanner may scan the sample 106 at one or more specified offsets above the surface of the slide 104.

Figure 5:
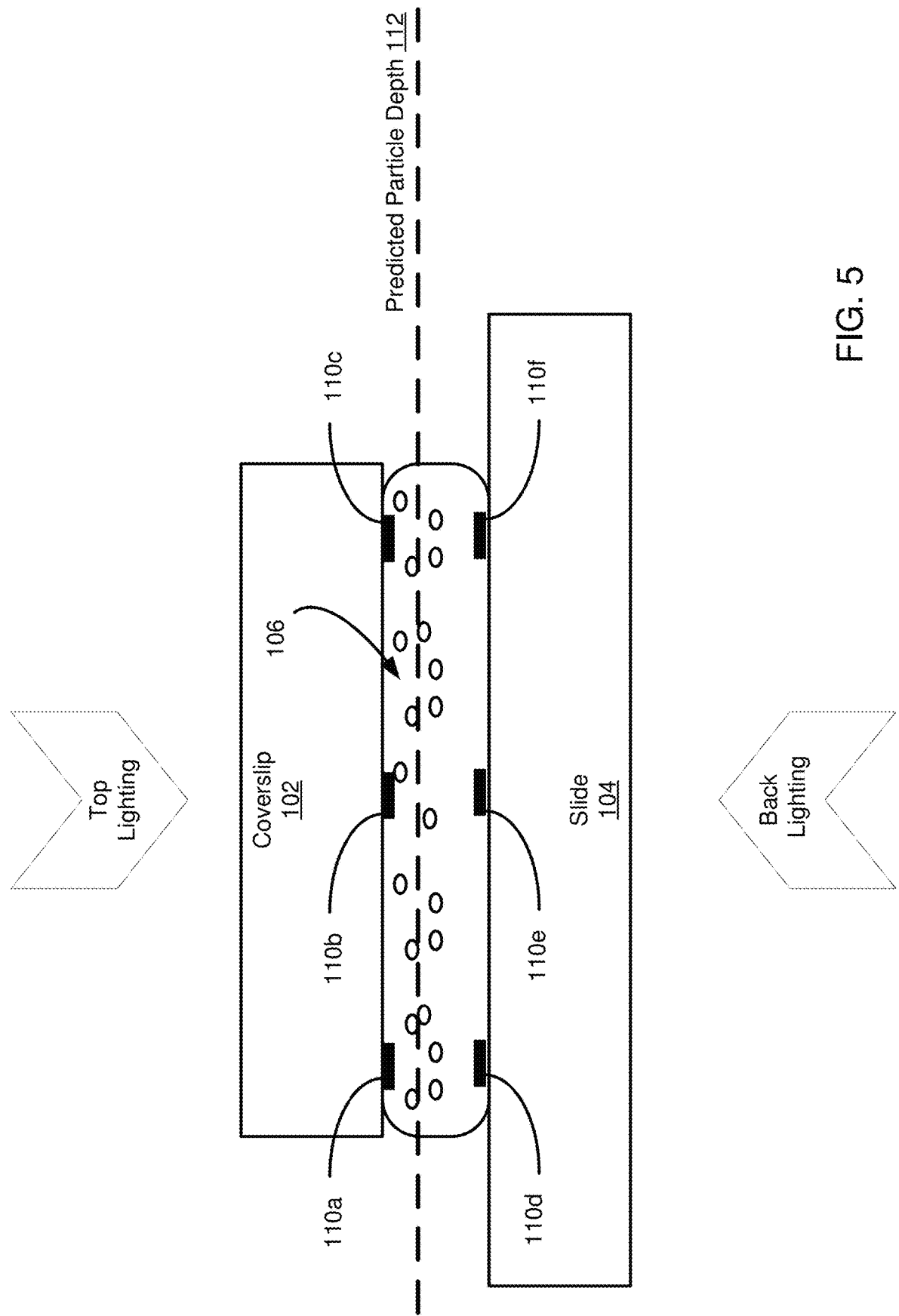
FIG. 5 illustrates a conceptual side-view diagram of a printed coverslip and printed slide being used to provide a reference focal surface at the bottom surface of the coverslip and the top surface of the slide so that a slide scanner can scan the sample at one or more specified offsets below the surface of the coverslip and/or above the surface of the slide.

FIG. 5 is a conceptual side view diagram of a sample 106 sandwiched between a slide 104 and a coverslip 102 for imaging with an optical microscope. In the embodiment illustrated in FIG. 5, the fiducial markers 110 are printed on the coverslip 102 and the slide 104 rather than only the coverslip 102 as illustrated in FIG. 1 or only the slide 104 as illustrated in FIG. 4. The coverslip 102 and the slide 104 are each printed such that a reference focal surface can be determined based at least in part on the fiducial markers 110a, 110b, 110c, 110d, 110e, 110f (collectively referred to as "110") printed on the coverslip 102 and the slide 104.

The scanning techniques discussed with respect to FIG. 1 also apply to the alternative embodiments illustrated in FIG. 4 and FIG. 5, with some alterations. When the fiducial marker 110 is printed on the top surface of the slide 104 rather than the bottom surface of the coverslip 102, the reference focal surface is identified with respect to the slide 104 rather than the coverslip 102. Said another way, the reference focal surface identified the top surface of the slide 104 and thereby identifies the bottom surface of the sample 106. This is different from the reference focal surface identifying the bottom surface of the coverslip 102 and thereby identifying the top surface of the sample 106, as discussed in connection with FIG. 1.

Printing on the coverslip 102 or the slide 104 permits a user or computer program to detect the location of the sample 106 even if the appearance of the sample itself is difficult to identify. In the case of the printed coverslip 102, the coverslip 102 is placed over the sample 106. In the case of the printed slide 104, the sample 106 is oriented within the printed region of the slide 104. In either case, the scan area is optimized to identify the printed area of the coverslip 102 or the slide 104 by way of an overview image. The appropriate scan area is defined for that sample type based on the printed area.

For example, a wet fecal coverslip with a plurality of fiducial markers defines a 20 mm×20 mm bounding box encompassing all fiducial markers. This can then be enlarged up to the full 22 mm×22 mm coverslip area or reduced to a smaller area before scanning. This can be determined based on the desired tradeoff between scan time, scan file size, and test sensitivity. Further for example, an air quality printed pattern includes a rectangular box surrounding the sample area as illustrated in FIGS. 3A-3B. The rectangular box can be used to define the scan area for that sample type.

In an embodiment, a method begins with capturing an overview image of the entire printed coverslip 102. In an alternative embodiment, the slide 104 rather than the coverslip 102 is imprinted, and the overview image captures the entire printed slide. In an embodiment, a sample is disposed on a slide, and a coverslip is disposed on the sample, and the overview image captures each of the coverslip, the sample, and the slide. The overview image would capture, for example, each of the eighteen (18) fiducial markers 210 imprinted on the coverslip 202 in FIGS. 2A-2B. Further, the overview image would capture, for example, each of the ten (10) fiducial markers and the focus frame imprinted on the coverslip 302 in FIGS. 3A-3B. It should be appreciated that the contents of the overview image will depend on the implementation of the printed coverslip, the sample, and/or the printed slide.

In the embodiment, after the overview image is captured, a reference focal surface is calculated. In an embodiment where the coverslip 102 is imprinted, the reference focal surface defines a bottom surface of the coverslip 102. In an embodiment where the slide 104 is imprinted, the reference focal surface defines a top surface of the slide 104. In either implementation, the reference focal surface defines a surface of the coverslip 102 or the slide 104 that comes in contact with a sample 106. The sample 106 is sandwiched between the coverslip 102 and the slide 104.

In furtherance of calculating the reference focal surface, the optical microscope is focused on a fiducial marker. The focal distance from the fiducial marker to an objective, camera, lens, eyepiece, or other pertinent component of the optical microscope is calculated based on results of focusing on the fiducial marker. The focal distance is the distance from the fiducial marker to a pertinent component of the optical microscope such as an objective lens, a camera lens, an eyepiece lens, an image sensor, and so forth. It should be understood that the focal distance may define a different distance based on different implementations. In an embodiment where the coverslip 102 is imprinted, the focal distance to the fiducial marker defines the bottom surface of the coverslip 102 and further defines the top surface of the sample 106. In an embodiment where the slide 104 is imprinted, the focal distance to the fiducial marker defines the top surface of the slide 104 and further defines the bottom surface of the sample 106.

The (x,y,z) coordinates for each fiducial marker are determined based on the focal distance for a certain fiducial marker and (x,y) coordinates for the certain fiducial marker relative to the overview image. The focal distance of a certain fiducial marker provides the z-axis coordinates for that fiducial marker. The location of a certain fiducial marker within the overview image provides the (x,y) coordinates for that fiducial marker. The reference focal surface is calculated based on the (x,y,z) coordinates of each of a plurality of fiducial markers.

In an embodiment, the reference focal surface is calculated by interpolating focal distances for space between two or more fiducial markers. In an embodiment, the surface curvature of a coverslip 102 and/or slide 104 between two adjacent fiducial markers is calculated by interpolating the z-axis coordinates for the two adjacent fiducial markers.

In an embodiment, the reference focal surface is calculated by extrapolating the focal distance for a certain fiducial marker to estimate focal distances for an area surrounding the certain fiducial marker. In such an embodiment, the surface curvature of the coverslip 102 and/or slide 104 for the area surrounding the certain fiducial marker is calculated based on the (x,y,z) coordinates of the certain fiducial marker.

In an embodiment, the reference focal surface is calculated by identifying three fiducial markers and calculating the (x,y,z) distances between the three fiducial markers. In the embodiment, a plane is fitted to the triangle defined by the (x,y,z) coordinates of the three fiducial markers. This process may be repeated for multiple sets of three fiducial markers to generate a triangle mesh defining the surface curvature and dimensions of the coverslip 102 and/or the slide 104.

In an embodiment, the reference focal surface is calculated by identifying four or more fiducial markers and the (x,y,z) coordinates for each of the four or more fiducial markers. In the embodiment, a curvature of the coverslip 102 and/or the slide 104 is fitted to the (x,y,z) points defined by the coordinates of the four or more fiducial markers. This is performed in furtherance of calculating a surface topology approximating the entire surface of the coverslip 102 and/or the slide 104.

It should be appreciated that the reference focal surface may be calculated based on one or more of the embodiments discussed herein. In an embodiment, the reference focal surface is calculated based on interpolation, extrapolation, fitting planes to triangles, and further by estimating a curvature based on coordinates of a plurality of fiducial markers.

FIGS. 6-9 are 20×-40× magnification high-resolution images of a fiducial marker such as those illustrated in FIGS. 2A-2B and 3A-3B.

Figure 6:
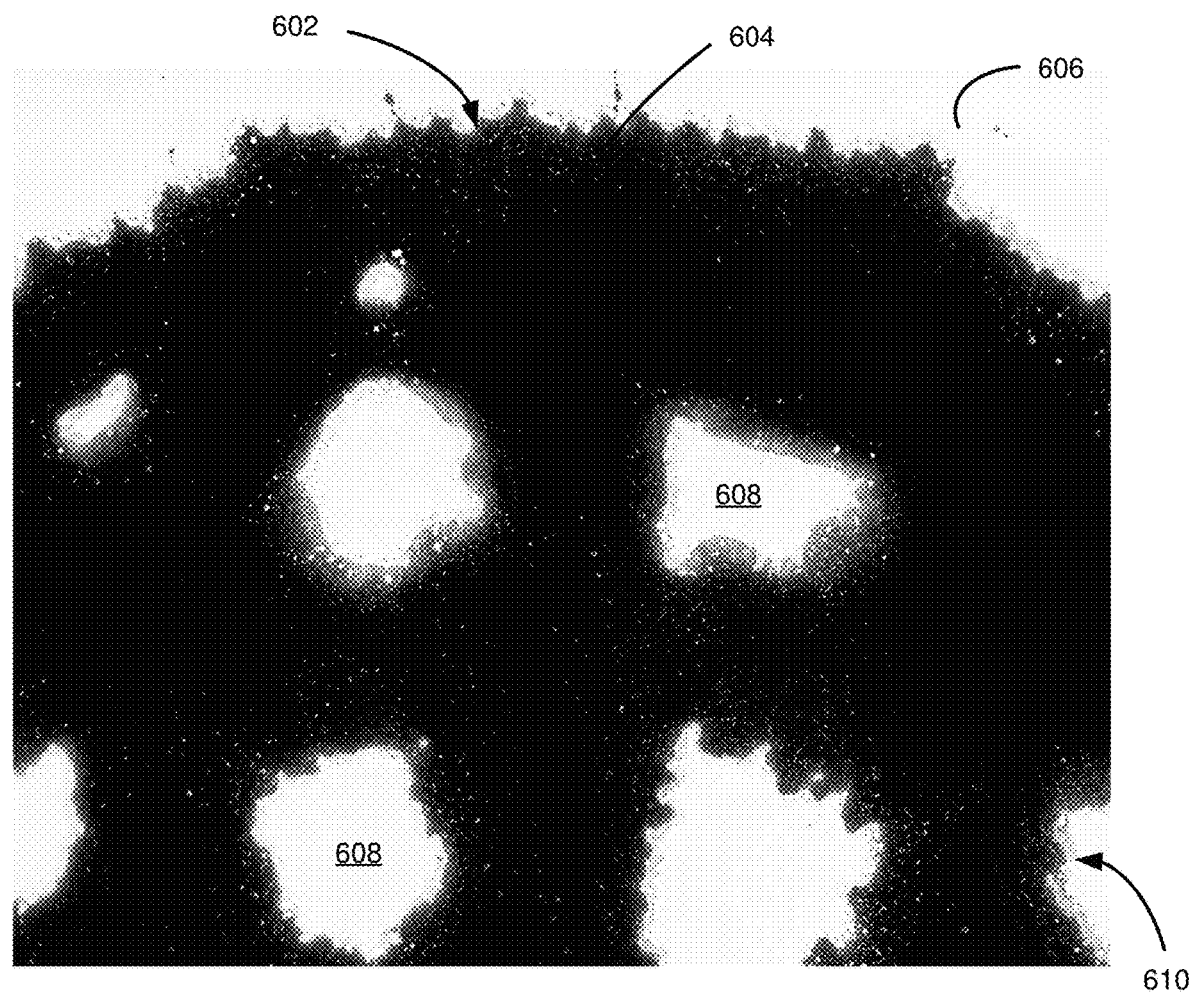
FIG. 6 is an example 20× magnification high-resolution image of a portion of a fiducial marker printed on a coverslip or slide.

FIG. 6 is a 20× magnification high-resolution image of a portion of a fiducial marker 110. FIG. 6 depicts the top side of the fiducial marker 110 indicated by the rounded profile 602 on the upper edge of the image. The external edge 602 presents a contrasting area for focus evaluation and may also be used to determine the orientation and location of the fiducial. The printed area 604 internal to the fiducial is visually distinct from the external area 606 where the background or sample is visible. The internal void areas 608 ensure that the internal area of the fiducial contains opaque to transparent transition areas 610 where optimal focus may be determined utilizing the fine-grained contrast presented by the ink texture in this embodiment.

Figure 7:
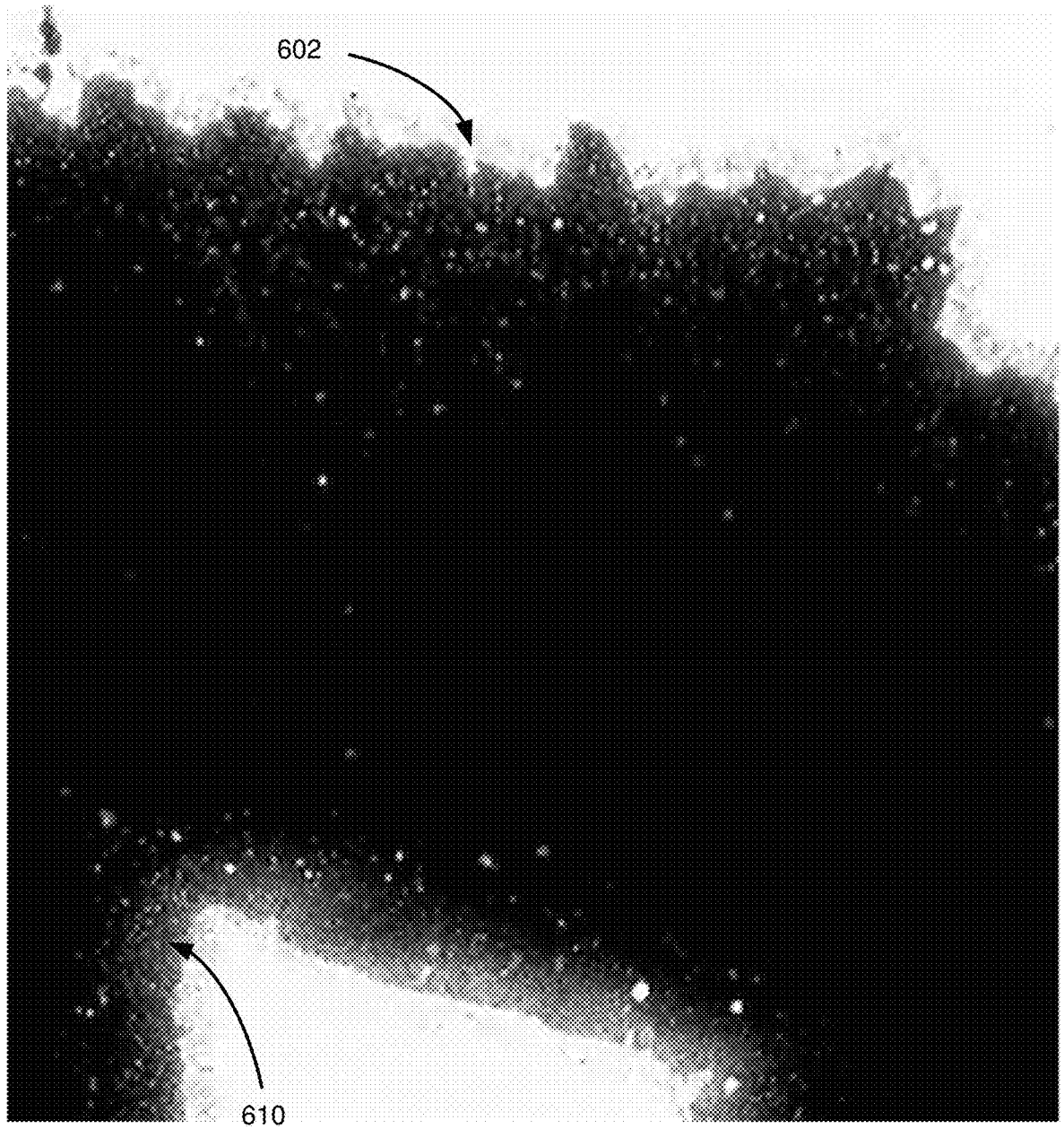
FIG. 7 is an example 40× magnification high-resolution image of a portion of a fiducial marker printed on a coverslip or slide having a dense distribution of fine-grained ink texture.

FIG. 7 is a 40× magnification high-resolution image of a portion of a fiducial marker 110 that provides additional detail on the contrasting texture of transition area 610 and external edge 602.

Figure 8:
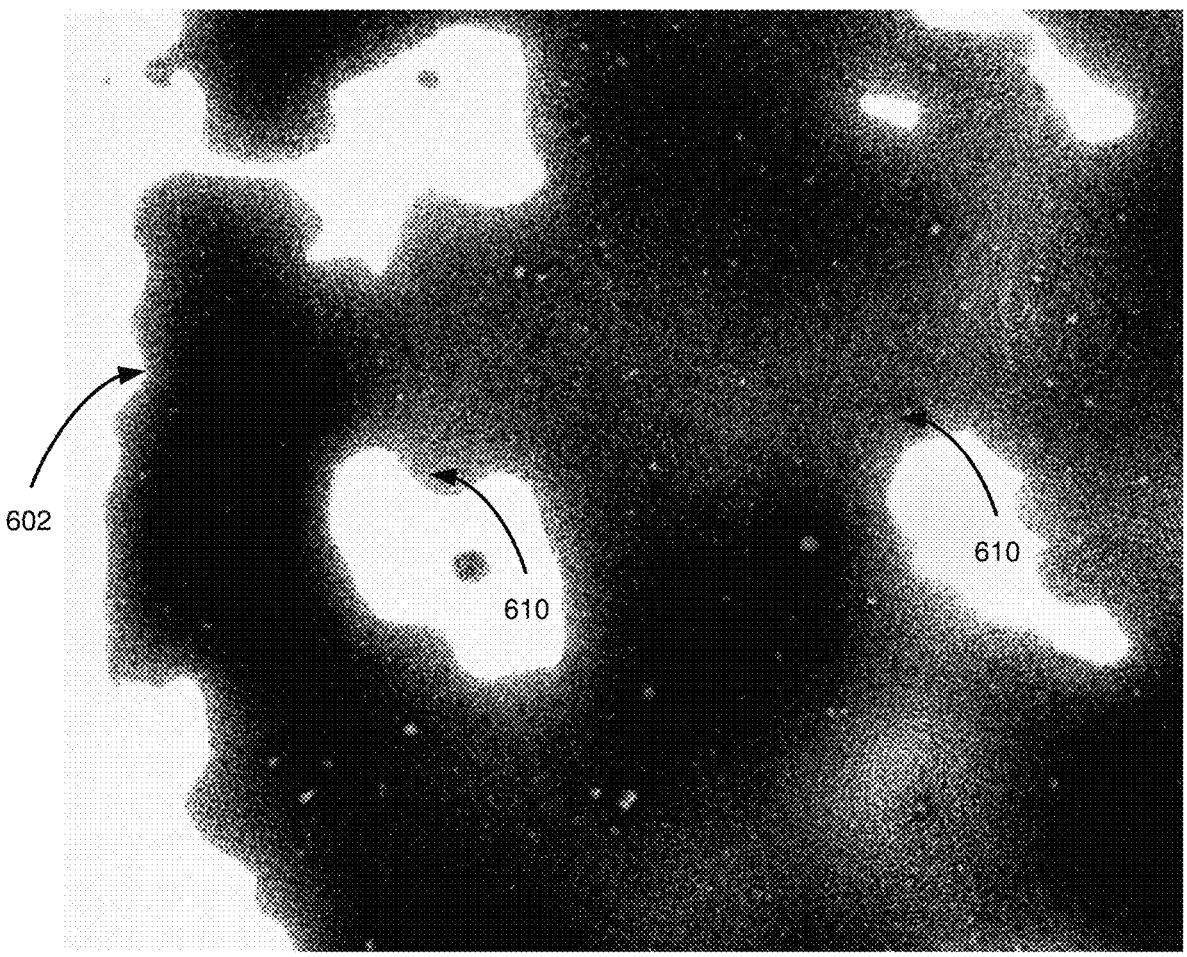
FIG. 8 is an example 20× magnification high-resolution image of a portion of a fiducial marker printed on a coverslip or slide having a sparser distribution of fine-grained ink texture in comparison to FIG. 8.

FIG. 8 is a 20× magnification high-resolution image of a portion of a fiducial marker 110. FIG. 8 depicts the left side of the fiducial marker 110 indicted by the rounded profile 602 on the left side of the image. The image shown in FIG.

8 includes a relatively dense distribution of fine-grained ink texture in the texture transition area 610 that can be used for focus optimization.

Figure 9:
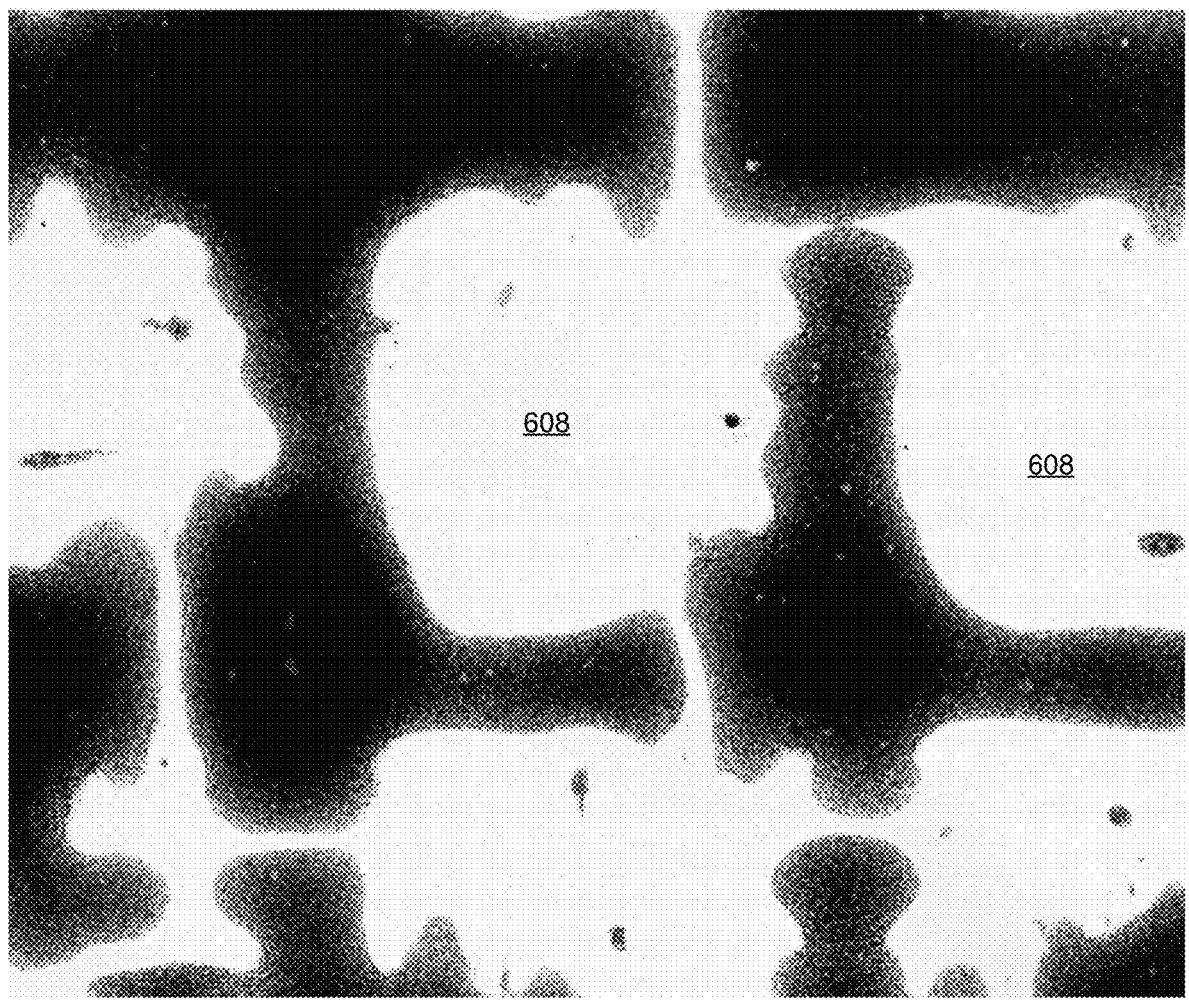
FIG. 9 is an example 20× magnification high-resolution image of a portion of a fiducial marker printed on a coverslip or slide.

FIG. 9 is a 20× magnification high-resolution image of a portion of a fiducial marker 110. The fine-grained ink texture in FIG. 9 is sparser than that in FIG. 8 with large internal void areas 608 such that FIG. 9 illustrates the lower end of the range of suitable ink distribution and density for fiducial markers. By tolerating a relatively large amount of variation, the printing process for the coverslip 102 remains simple and reduces cost.

FIGS. 10A and 10B depict example images created by an automated slide scanner used in conjunction with a printed coverslip 102 as discussed herein. FIG. 10A is an image depicting the edge of a fiducial marker 110, where the light portion represents a clear portion of the coverslip 102 (with no fiducial marker 110), and the dark portion represents the fiducial marker 110. FIG. 10B is an image depicting an internal grid of a fiducial marker 110 such as the hashing or dot array depicted in FIGS. 2A-2B or FIGS. 3A-3B.

In furtherance of capturing the images depicted in FIGS. 10A-10B, an automated slide scanner objective is located on the fiducial markers 110 to calculate the (x,y) coordinates of the fiducial prior to focusing on it. In FIGS. 10A-10B, the dotted lines represent an expected edge 1002 of a fiducial marker 110. The expected edge 1002 is calculated by a system such as the automated slide scanner. The expected edge 1002 may be calculated based on a reference image such as an overview image of the entire printed coverslip or slide. The unbroken lines represent the captured edge 1004 of the fiducial marker 110 as captured in the images illustrated in FIGS. 10A-10B. The images represented in FIGS. 10A-10B may represented zoomed-out images captured using an automated slide scanner objective and camera. The captured edge 1002 represents the actual transition from light to dark of the fiducial marker 110 as captured in a high-magnification field of view. The arrow represents a position move or vector 1006 indicating a relative positional move required to place the microscope objective in the center of the fiducial marker 110.

In an embodiment, after a macro image of a sample 106 and a coverslip 102 are captured, an automated slide scanner or other system calculates the expected edge 1002 of the fiducial marker 110. The expected edge 1002 indicates the predicted size and shape for at least one fiducial marker 110 that is printed on the coverslip 102. In one embodiment, the expected edge is calculated based on prior input of the shape of fiducial marker 110 into the system. In another embodiment, the expected edge is calculated based on the shape of the fiducial marker 110 in the macro image. The location of the fiducial marker 110 in the macro image is used to predict the microscope stage position that will bring the fiducial marker 110 into the high-magnification field of view for the automated slide scanner objective. The system moves the microscope stage to the predicted location of the fiducial marker 110 and scans the sample 106 in a search pattern such as an inward or outward spiral movement. When at least a portion of the fiducial marker 110 is in view, the system determines the captured edge 1004 of the fiducial marker 110. The captured edge 1004 is determined as being the location of the transition from light to dark in the fiducial marker 110. The system compares the expected edge 1002 to the captured edge 1004 to determine the location of the captured high-magnification image relative to the macro image of the coverslip 102. In an embodiment, the location of the macro image relative to the coverslip 102 is determined by matching the expected edge 1002 to the captured edge 1004 within an accepted tolerance threshold.

As shown in FIG. 10A, the expected edge 1002 (represented by the dotted line) curves around the expected edge of a fiducial marker 110 where the transition from light to dark is predicted to occur. The captured edge 1004 (represented by the unbroken line) is assessed to trace the edges of the fiducial marker 110 where the transition from light to dark actually occurs.

In some instances, the desired placement of the point for generation of the calculated focal surface is the "interior grid" of the fiducial marker 110 rather than the actual edge of the fiducial marker 110. The interior grid of the fiducial marker 110 includes the dots or hashing within the fiducial marker 110 as illustrated in FIGS. 2A-2B and FIGS. 3A-3B. In such an instance, the system may utilize the relative percentages of dark and light in the high-magnification image and the placement of the macro image relative to the coverslip 102 to calculate a relative positional move or vector 1006 to place the microscope objective in the center of the fiducial marker 110. This relative positional move or vector 1006 is represented by the arrow in FIG. 10A.

In some instances, the captured image includes a depiction of the interior grid of the fiducial marker 110. This is illustrated in FIG. 10B. The light and dark areas depicted in FIG. 10B represent the hashing or dot array within the fiducial marker 110. The image shown in FIG. 10B might be captured by calculating the positional move or vector 1006 required to image at that location. Alternatively, the image shown in FIG. 10B might be captured by imaging that location directly at startup.

In an embodiment, the expected edge 1002, the calculated edge 1004, and the positional move or vector 1006 may be used for various purposes for optimizing the system. For example, one or more of these parameters may be used for system calibration, for data retention, or for operator control. The capture and retention of lower resolution images may allow for faster calculation and data manipulation times. This additionally lowers the cost of data storage.

In an embodiment, a high-magnification image is captured by a camera associated with an optical microscope. The high-magnification image is assessed to determine if a fiducial marker is captured in the image. If there is no fiducial marker captured in the image, then the stage or objective of the optical microscope is moved to change the field of view for the camera associated with the optical microscope. The stage or objective of the optical microscope may be moved in any suitable fashion, for example in a spiral configuration moving outward from the original high-magnification image location. After the stage or objective is moved, a new high-magnification image is captured. The new high-magnification image is assessed to determine if a fiducial marker is captured in the image. This process may be repeated any number of times until a fiducial marker is captured in the high-magnification image.

In response to determining that a fiducial marker is captured in the high-magnification image, the high-magnification image is assessed to determine whether an entirety of the fiducial marker, or only a portion of the fiducial marker, is captured in the high-magnification image. Alternatively, if the fiducial marker is larger than the high-magnification field of view captured by the optical microscope camera, the image may be assessed to determine whether the entire field of view is covered by the fiducial marker or if only a portion of the field of view contains a fiducial marker. In response to only a portion of the field of view containing a fiducial marker and only a portion of the fiducial marker being captured in the image, a captured edge 1004 of the fiducial marker is identified. The captured edge 1004 is compared to an expected edge 1002 of the fiducial marker. The expected edge 1002 may be determined based on an overview macro image that captures the entire printed coverslip or slide and includes the fiducial marker that is captured in the high-magnification image. The captured edge 1004 and the expected edge 1002 are compared to determine whether the expected edge 1002 matches the captured edge 1004 within an accepted tolerance threshold.

Figure 11A:
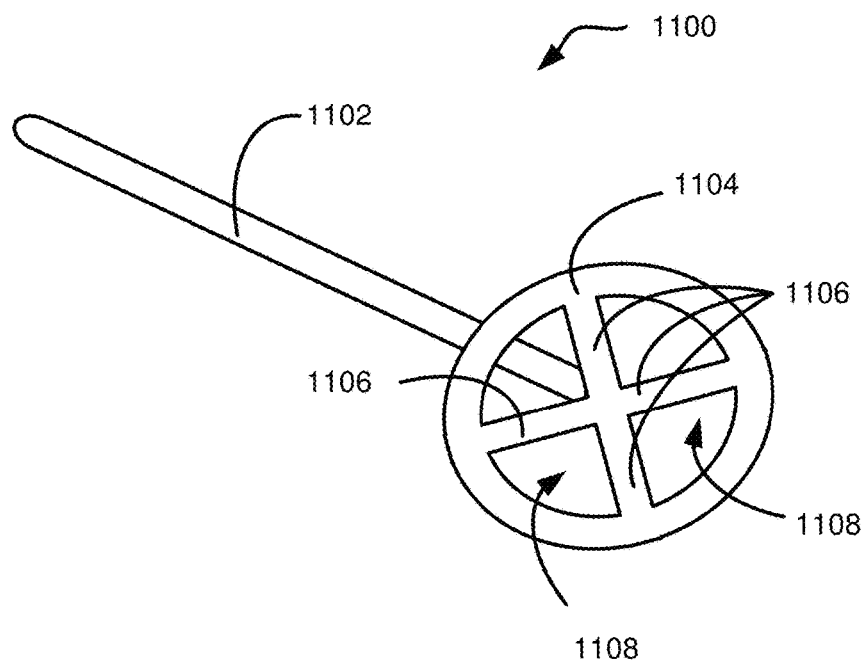
FIG. 11A is a perspective side view of an embodiment of a sample transfer tool having an elongated member disposed centrally to an outer loop.

FIGS. 11A-13C illustrate various views of different embodiments of a sample transfer tool 1100, 1200, 1300. FIGS. 11A, 12A, and 13A illustrates a perspective view of different embodiments of a sample transfer tool 1100, 1200, 1300. FIGS. 11B, 12B, and 13B illustrates a straight-on aerial view of different embodiments of the sample transfer tool 1100, 1200, 1300. FIGS. 11C, 12C, and 13C illustrates a straight-on side view of different embodiments of the sample transfer tool 1100, 1200, 1300.

Figure 11B:
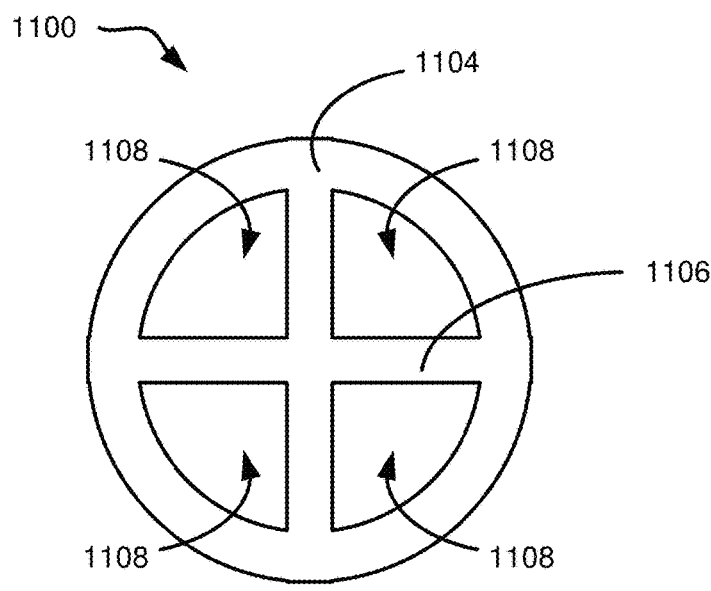
FIG. 11B is a straight-on aerial view of an embodiment of a sample transfer tool having an elongated member disposed centrally to an outer loop.
Figure 11C:
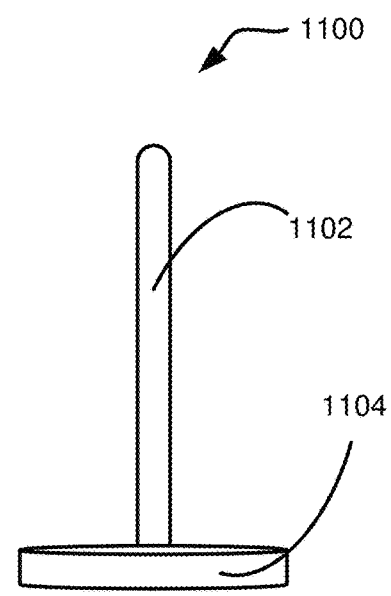
FIG. 11C is a straight-on side view of an embodiment of a sample transfer tool having an elongated member disposed centrally to an outer loop.

FIGS. 11A-11C illustrate an embodiment of the sample transfer tool 1100 wherein an elongated member 1102 is centered within the outer loop 1104. The sample transfer tool 1100 can be used for placing a liquid sample on a slide 104 for performing light microscopy analysis on the liquid sample. The sample transfer tool 1100 is particularly useful for capturing a sample stored within a test tube, such as a cylindrical test tube. In some instances, a sample 106 is centrifuged within a test tube to separate the particles 108 of interest from other components of the sample 106, such as a solvent or other solution. In some instances, the particles 108 are located at the top-most part of the sample 106 after centrifugation. In such an instance, the sample transfer tool 1100 is particularly effective for capturing the particles 108 located at the top-most part of the sample 106 within the test tube.

The sample transfer tool 1100 includes an elongated member 1102 that serves as a handle. At one end of the elongated member 1102, the sample transfer tool 1100 includes an outer loop 1104 with one or more spokes 1106 attached to the outer loop 1104 and located within an interior space defined by the outer loop 1104. The one or more spokes 1106 in combination with the outer loop 1104 serve to define a sample capture loop 1108. The sample capture loop 1108 defines an interior space wherein a sample is captured by way of surface tension forces.

The sample capture loop 1108 is defined by a combination of one or more spokes 1106 and a portion of the outer loop 1104. It is noted that the figures point to the interior space defined by the sample capture loop 1108 for illustrative purposes only. Each of the sample capture loops 1108 serves to capture or "pick up" a sample 108 through use of surface tension forces. The sample can attach to the spokes 1106 and outer loop 1104 that define the sample capture loop 1108, and the sample can "stretch" across the empty interior space defined by the sample capture loop 1108 by way of surface tension forces. The sample capture loop 1108 may be a semi-triangular shape as shown in FIGS. 11A-11C or it may define any suitable shape, such as a circular or elliptical shape, a rectangular shape, some other abstract shape, and so forth.

The outer loop 1104 may be circular as illustrated, or it may be another suitable shape such as square, rectangular, oval, and so forth. As depicted, the outer loop 1104 and spokes 1106, may be formed in a plane generally orthogonal to the elongated member 1102. The outer loop 1104 and spokes 1106 are sized to hold liquid therein by surface tension when inserted into a liquid sample. In the depicted embodiment, there are four spokes 1106 within the outer loop 1104. It should be appreciated there could be any number of spokes 1106 within the outer loop 1104. Alternatively, there may be no spokes 1106 within the outer loop 1104, and the outer loop 1104 may be attached directly to the elongated member 1102.

In an example illustrative implementation, the sample transfer tool 1100 is used for transferring liquid solution containing animal fecal matter to a slide 104 for analysis by light microscopy. The fecal matter sample may be prepared by mixing an obtained stool sample with suitable reagent, filtering the mixture, and performing centrifugation in a suitable container such as a test tube. In the example implementation, the particles 108 of interest within the fecal matter are located at the top-most portion of the solution after centrifugation. Therefore, it is desirable to capture only the meniscus or top-most portion of the sample located in the test tube, because this portion of the sample includes the particles 108 of interest. The sample transfer tool 1100 may be sized for insertion into the test tube to contact the liquid portion of the sample. The liquid is then then retained in the plurality of sample capture loops 1108 of the sample transfer tool 1100 by surface tension. The sample transfer tool 1100 may then be placed into contact with a microscope slide 104. Liquid contacting the slide 104 may then release from the sample capture loops 1108 to form a pool on the slide 104. A coverslip 102 may then be placed over the pool to form an arranged sample for analysis. The sample transfer tool 1100 may be sized for insertion into the test tube and further for the outer loop 1102 to create a pool that corresponds to the area of the coverslip 102 with a suitable thickness for the desired analysis.

The outer loop 1104 defines an interior space. In an embodiment as illustrated in FIGS. 11A-13C where the outer loop 1104 is a circular or elliptical shape, the interior spaces of the outer loop 1104 form a circular or elliptical shape. The outer loop 1104 may alternatively be a square shape, a rectangular shape, a pentagon shape, a hexagon shape, an octagon shape, and so forth. The one or more spokes 1106 are attached to the outer loop 1104 and disposed within the interior space defined by the outer loop 1104. In an embodiment, the one or more spokes 1106 are normal to the elongated member 1102 or approximately normal to the elongated member 1102. In turn, the outer loop 1104 is also normal to the elongated member 1102 or approximately normal to the elongated member 1102.

The sample transfer tool 1100 may be constructed of a rigid material such as polycarbonate, metal, wood, and so forth. The sample transfer tool 1100 may be constructed of a semi-rigid material.

The outer loop 1104 in combination with the one or more spokes 1106 defines one or more sample capture loops 1108. Each of the one or more sample capture loops 1108, together with the one or more spokes 1106, make up the totality of the interior space defined by the outer loop 1104. The sample capture loops 1108 are defined for holding a liquid by way of surface tension properties. The sample capture loops 1108 enable the sample transfer tool 1100 to pick up a liquid sample and "stretch" the liquid across the sample capture loop 1108. The sample capture loops 1108 are defined by the wall of the outer loop 1104 and one or more spokes 1106 as illustrated in FIGS. 11A-11B, 12A-12B, and 13A-13B.

In the embodiment illustrated in FIGS. 11A-11C, the sample transfer tool 1100 includes four spokes 1106. The four spokes 1106, together with the outer loop 1104, collectively define four separate sample capture loops 1108. It should be appreciated that the sample transfer tool 1100 may include any suitable number of spokes 1104 and therefore may include any suitable number of sample capture loops 1108.

In an embodiment, the number of sample capture loops 1308 provides a measuring component for the sample transfer tool 1100. In some instances, depending on the type of sample being transferred or the preparation methods for that sample, it may be desirable to have many small sample capture loops 1108. Each of the sample capture loops 1108 may be effective for picking up particles 108 of interest within the sample. Therefore, it may be desirable to use a sample transfer tool 1100 with many sample capture loops 1108 rather than transferring the sample numerous times. In some implementations, the sample transfer tool 1100 enables a user to transfer the sample from the test tube to a slide only one time, and still collect an illustrative number of particles 108 of interest to be imaged.

Figure 12A:
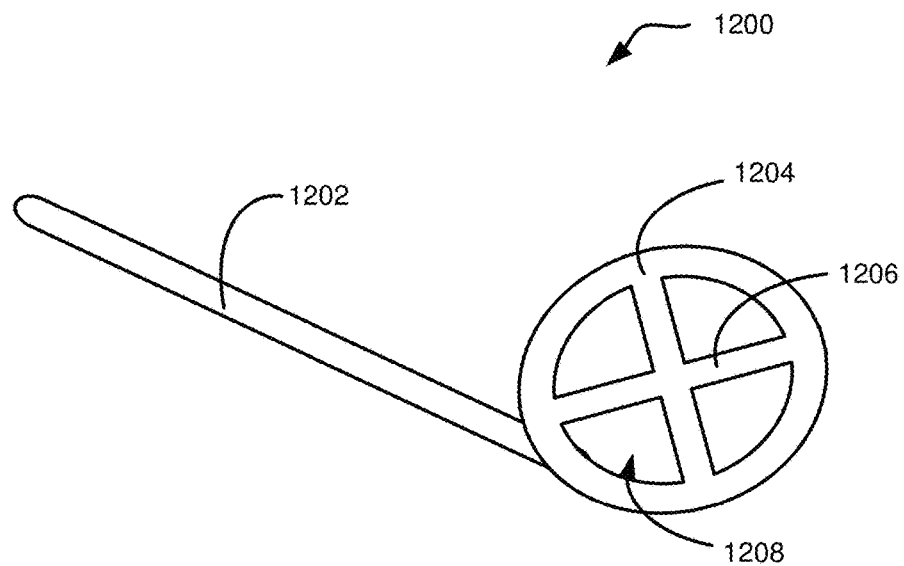
FIG. 12A is a perspective side view of an embodiment of a sample transfer tool having an elongated member disposed offset from the center of an outer loop.
Figure 12B:
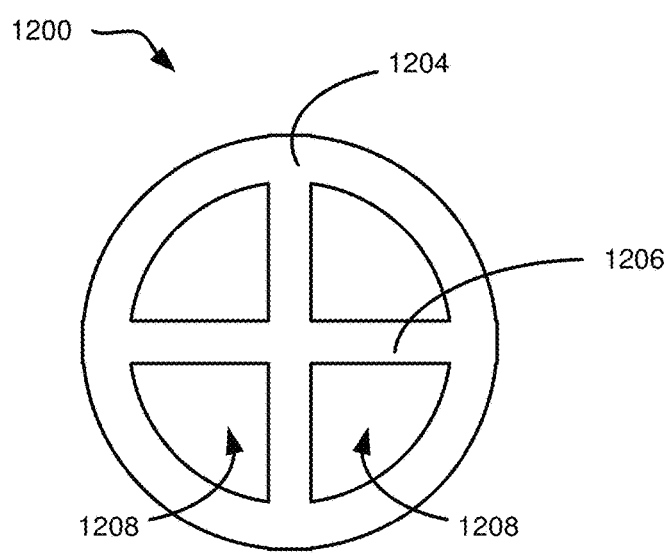
FIG. 12B is a straight-on aerial view of an embodiment of a sample transfer tool having an elongated member disposed offset from the center of an outer loop.
Figure 12C:
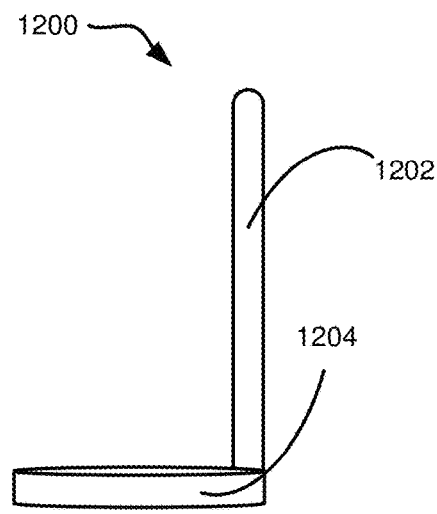
FIG. 12C is a straight-on side view of an embodiment of a sample transfer tool having an elongated member disposed offset from the center of an outer loop.

FIGS. 12A-12C illustrate an embodiment of the sample transfer tool 1200. Similar to the embodiment illustrated in FIGS. 11A-11C, the sample transfer tool 1200 includes an elongated member 1202, an outer loop 1204, one or more spokes 1206, and one or more sample capture loops 1208 defined by a combination of the outer loop and one or more of the spokes 1206. In the embodiment illustrated in FIGS. 12A-12C, the elongated member 1202 is offset from the center of the outer loop 1204 and instead attached to the outer loop 1204 itself, rather than one or more of the spokes 1206 as illustrated in FIGS. 11A-11C.

FIGS. 13A-13C illustrate an embodiment of the sample transfer tool 1300. Similar to the embodiments illustrated in FIGS. 11A-11C and FIGS. 12A-12C, the sample transfer tool 1300 includes an elongated member 1302, an outer loop 1304, one or more spokes 1306, and one or more sample capture loops 1308. The one or more sample capture loops 1308 are defined by one or more of the spokes 1306 and at least a portion of the outer loop 1304. The sample capture loops 1308 define an empty interior space wherein a sample can be captured and picked up through the use of surface tension forces.

In the embodiment illustrated in FIGS. 13A-13C, the outer loop 1304 includes ribbing or a jagged edge. The ribbing of the outer loop 1304 can be useful for providing additional points of contact to a sample and can therefore be useful in increasing the likelihood that the sample is captured by the sample transfer tool 1300. The ribbing on the outer loop 1304 may be particularly useful for certain samples or solutions. In a further embodiment, the spokes 1304 may additionally include ribbing or jagged edges.

Further in this embodiment of the sample transfer tool 1300, there are eight spokes 1306 attached to the outer loop 1304. The eight spokes 1306, together with the outer loop 1304, define eight separate sample capture loops 1308. It should be appreciated that there may be any number of loops 1306 within the interior space defined by the outer loop 1304. Therefore, the sample transfer tool 1300 may include any suitable number of sample capture loops 1308.

FIG. 14 is a schematic flow chart diagram of a method 1400 for focusing on a sample using light microscopy. The method 1400 may be performed by a person using an optical microscope and/or by a computer program in communication with a camera of an optical microscope. The method 1400 may be performed by a computer system operating a machine learning algorithm analyzing images captured by an optical microscope.

The method 1400 begins and a person or a computer program identifies at 1402 a fiducial marker printed on a surface of a coverslip. The method 1400 continues and a person or a computer program focuses the optical microscope on the fiducial marker at 1404 to calculate a focal distance of the fiducial marker. The method 1400 continues and a person or a computer program calculates at 1406 a reference focal surface defining the surface of the coverslip based at least in part on the focal distance of the fiducial marker. The location of the fiducial marker may be determined based on results of focusing the optical microscope on the fiducial marker.

FIG. 15 is a schematic flow chart diagram of a method 1500 for focusing on a sample using light microscopy. The method 1500 may be performed by a person using an optical microscope and/or by a computer program in communication with a camera of an optical microscope. The method 1500 may be performed by a computer system operating a machine learning algorithm analyzing images captured by an optical microscope.

The method 1500 begins and a person or a computer program identifies at 1502 a fiducial marker printed on a surface of a slide. The method 1500 continues and a person or a computer program focuses the optical microscope on the fiducial marker at 1504 to calculate a focal distance of the fiducial marker. The method 1500 continues and a person or a computer program calculates at 1506 a reference focal surface defining the surface of the slide based at least in part on the focal distance of the fiducial marker. The location of the fiducial marker may be determined based on results of focusing the optical microscope on the fiducial marker.

FIG. 16 is a schematic flow chart diagram of a method 1600 for focusing on a sample using light microscopy. The method 1600 may be performed by a person using an optical microscope and/or by a computer program in communication with a camera of an optical microscope. The method 1600 may be performed by a computer system operating a machine learning algorithm analyzing images captured by an optical microscope.

The method 1600 begins and a person or a computer program identifies at 1602 a fiducial marker printed on a coverslip, wherein the fiducial marker is printed on a bottom surface of the coverslip relative to an eyepiece or camera of an optical microscope. The method 1600 continues and a person or a computer program focuses the optical microscope on the fiducial marker at 1604. The method 1600 continues and a person or a computer program calculates at 1606 a reference focal surface defining the bottom surface of the coverslip based on a location of the fiducial marker. The location of the fiducial marker may be determined based on results of focusing the optical microscope on the fiducial marker.

FIG. 17 is a schematic flow chart diagram of a method 1700 for focusing on a sample using light microscopy. The method 1700 may be performed by a person using an optical microscope and/or by a computer program in communication with a camera of an optical microscope. The method 1700 may be performed by a computer system operating a machine learning algorithm analyzing images captured by an optical microscope.

The method 1700 begins and a person or a computer program identifies at 1702 a fiducial marker printed on a slide, wherein the fiducial marker is printed on a top surface of the slide relative to an eyepiece or camera of an optical microscope. The method 1700 continues and a person or a computer program focuses the optical microscope on the fiducial marker at 1704. The method 1700 continues and a person or a computer program calculates at 1706 a reference focal surface defining the top surface of the slide based on a location of the fiducial marker. The location of the fiducial marker may be determined based on results of focusing the optical microscope on the fiducial marker.

FIG. 18 is a schematic flow chart diagram of a method 1800 for focusing on a sample using light microscopy. The method 1800 may be performed by a person using an optical microscope and/or by a computer program in communication with a camera of an optical microscope. The method 1800 may be performed by a computer system operating a machine learning algorithm analyzing images captured by an optical microscope.

The method 1800 begins and a person or a computer program identifies at 1802 a fiducial marker printed on a surface of a coverslip or a surface of a slide. A person or a computer program focuses at 1804 the optical microscope on the fiducial marker to calculate a focal distance of the fiducial marker. A person or a computer program calculates at 1806 a reference focal surface defining either of the surface of the coverslip or the surface of the slide based on the focal distance of the fiducial marker.

FIG. 19 is a schematic flow chart diagram of a method 1900 for defining a reference focal surface for a coverslip or a slide based on a plurality of fiducial markers printed on the coverslip or the slide. The method 1900 may be performed by a person using an optical microscope and/or by a computer program in communication with a camera of an optical microscope. The method 1900 may be performed by a computer system operating a machine learning algorithm analyzing images captured by an optical microscope.

The method 1900 begins and a person or a computing system focuses at 1902 an optical microscope on each of a plurality of fiducial markers printed on a surface of a coverslip or a slide to calculate a focal distance for each of the plurality of fiducial markers. In an embodiment, the optical microscope focuses on each of the plurality of fiducial markers independently one at a time. The method 1900 continues and a person or a computer system matches at 1904 the focal distance for each of the plurality of fiducial markers with a corresponding location for each of the plurality of fiducial markers. The corresponding locations may be determined based on an overview image of the entire coverslip or slide. The method 1900 continues and a person or a computing system calculates at 1906 a reference focal surface for the coverslip or the slide based on the corresponding focal distance and location of each of the plurality of fiducial markers 1906. The reference focal surface for the coverslip or the slide further defines a surface of a sample sandwiched between a coverslip and a slide.

EXAMPLES

The following examples pertain to further embodiments.

Example 1 is a method. The method includes identifying a fiducial marker printed on a surface of a coverslip and focusing an optical microscope on the fiducial marker to calculate a focal distance of the fiducial marker. The method includes calculating a reference focal surface defining the surface of the coverslip based on the focal distance of the fiducial marker.

Example 2 is a method as in Example 1, wherein: the fiducial marker is printed on a bottom surface of the coverslip relative to an eyepiece or camera of the optical microscope, such that the bottom surface is in contact with a sample; the reference focal surface defining the surface of the coverslip defines the bottom surface of the coverslip; and the reference focal surface defining the bottom surface of the coverslip further defines a top surface of the sample relative to the eyepiece or the camera of the optical microscope.

Example 3 is a method as in any of Examples 1-2, further comprising: scanning the coverslip with the optical microscope to generate an overview scan; identifying a plurality of fiducial markers printed on the surface of the coverslip based on the overview scan; calculating a quantity of fiducial markers printed on the surface of the coverslip based on the overview scan; and identifying a location of each of the plurality of fiducial markers printed on the coverslip based on the overview scan.

Example 4 is a method as in any of Examples 1-3, wherein calculating the reference focal surface defining the surface of the coverslip comprises: focusing the optical microscope on each of the plurality of fiducial markers printed on the coverslip to calculate a focal distance for each of the plurality of fiducial markers; matching the focal distance for each of the plurality of fiducial markers with a corresponding location for each of the plurality of fiducial markers; and calculating the reference focal surface based on the corresponding focal distance and location of each of the plurality of fiducial markers.

Example 5 is a method as in any of Examples 1-4, wherein calculating the reference focal surface further comprises: interpolating focal distances for space between two or more fiducial markers based on focal distances for the two or more fiducial markers; and extrapolating the focal distance for a certain fiducial marker of the plurality of fiducial markers to estimate focal distances for an area surrounding the certain fiducial marker.

Example 6 is a method as in any of Examples 1-5, wherein calculating the reference focal surface further comprises: identifying three fiducial markers of the plurality of fiducial markers; identifying focal distances for each of the three fiducial markers; identifying locations for each of the three fiducial markers relative to the overview scan; and fitting planes to triangles defined by the three fiducial markers based at least in part on the focal distances and the locations for each of the three fiducial markers.

Example 7 is a method as in any of Examples 1-6, wherein calculating the reference focal surface further comprises: identifying four or more fiducial markers of the plurality of fiducial markers; identifying (x,y,z) coordinates for each of the four or more fiducial markers based on focal distances for each of the four or more fiducial markers and locations of each of the four or more fiducial markers relative to the overview scan; and fitting curved surfaces to points defined by the (x,y,z) coordinates of each of the four or more fiducial markers to generate a surface topology approximating the entire surface of the coverslip.

Example 8 is a method as in any of Examples 1-7, wherein the fiducial marker is printed on a bottom surface of the coverslip relative to an eyepiece or camera of the optical microscope, such that the bottom surface is in contact with a sample, and wherein the method further comprises: calculating a predicted focal distance to the sample based on results of the focusing of the optical microscope on one or more fiducial markers; and refining focus on the sample by testing a threshold range of focal distances that are greater than the predicted focal distance to the sample and/or less than the predicted focal distance to the sample.

Example 9 is a method as in any of Examples 1-8, further comprising: scanning the coverslip with the optical microscope to generate an overview scan; identifying the fiducial marker within the overview scan; calculating a z-axis location of the fiducial marker based on the focal distance to the fiducial marker; and calculating an x-axis and a y-axis location of the fiducial marker based on a location of the fiducial marker relative to the overview scan.

Example 10 is a method as in any of Examples 1-9, further comprising preparing a sample for imaging with the optical microscope by placing the sample on a slide using a sample transfer tool, wherein the sample transfer tool comprises: an elongated member; an outer loop defining an interior space; and one or more spokes attached to the outer loop and disposed within the interior space of the outer loop; wherein at least one spoke of the one or more spokes and at least a portion of the outer loop define a sample capture loop for capturing the sample; and wherein the elongated member is approximately normal to the one or more spokes.

Example 11 is a method as in any of Examples 1-10, further comprising identifying a chiral indicator on the coverslip and determining the orientation of the coverslip based on the chiral indicator.

Example 12 is a method as in any of Examples 1-11, wherein the fiducial marker is printed on a bottom surface of the coverslip relative to an eyepiece or camera of the optical microscope, such that the bottom surface is in contact with a sample, and wherein the method further comprises locating a particle of interest within the sample by focusing the optical microscope on a predicted particle depth, wherein the predicted particle depth is an estimated depth where the particle is located in the sample relative the bottom surface of the coverslip.

Example 13 is a method as in any of Examples 1-12, wherein focusing the optical microscope on the predicted particle depth comprises determining the predicted particle depth relative to the optical microscope based on the reference focal surface.

Example 14 is a method as in any of Examples 1-13, further comprising: receiving an image of the coverslip captured by a camera associated with the optical microscope; assessing the image to determine if a fiducial marker is captured in the image; in response to no fiducial marker being visible in the image, altering a field of view for the camera associated with the optical microscope; receiving a new image of the coverslip captured by the camera with the altered field of view; and assessing the new image to determine if a fiducial marker is captured in the image.

Example 15 is a method as in any of Examples 1-14, further comprising, in response to a fiducial marker being captured in the image and/or the new image: assessing the image and/or the new image to determine whether an entirety of the captured fiducial marker is present in the image and/or the new image or a portion of the captured fiducial marker is present in the image and/or the new image; in response to only a portion of the captured fiducial marker being present in the image and/or the new image, identifying a captured edge outline of the captured fiducial marker; retrieving from memory an expected edge outline of the captured fiducial marker based on an overview image of the coverslip comprising all fiducial markers; and comparing the captured edge outline with the expected edge outline to calculate an estimated direction and distance required to move a stage or an objective of the optical microscope such that the entirety of the captured fiducial marker is present in a field of view of the optical microscope.

Example 16 is a method as in any of Examples 1-15, further comprising: causing the stage and/or the objective of the optical microscope to move according to the estimated direction and distance; determining (x,y) coordinates for the stage and/or the objective of the microscope after movement; and storing in memory an (x,y) coordinate of the captured fiducial marker based on the (x,y) coordinates of the stage and/or the objective.

Example 17 is a method as in any of Examples 1-16, further comprising, in response to a fiducial marker being captured in the image and/or the new image: assessing the image and/or the new image to determine whether an entirety of the field of view is covered by the captured fiducial marker; in response to only a portion of the field of view being covered by the captured fiducial marker, identifying a captured edge outline of the captured fiducial marker; retrieving from memory an expected edge outline of the captured fiducial marker based on an overview image of the coverslip comprising all fiducial markers; and comparing the captured edge outline with the expected edge outline to calculate an estimated direction and distance required to move a stage or an objective of the optical microscope such that the entirety of the field of view of the optical microscope is covered by the fiducial marker.

Example 18 is a method as in any of Examples 1-17, further comprising: causing the stage and/or the objective of the optical microscope to move according to the estimated direction and distance; determining (x,y) coordinates for the stage and/or the objective of the microscope after movement; and storing in memory an (x,y) coordinate of the captured fiducial marker based on the (x,y) coordinates of the stage and/or the objective.

Example 19 is a method as in any of Examples 1-18, further comprising: retrieving from memory an expected edge outline of a first fiducial marker printed on the coverslip based on an overview image comprising all fiducial markers printed on the coverslip; identifying a captured edge outline of the first fiducial marker based on an image captured with the optical microscope; comparing the expected edge outline of the first fiducial marker with the captured edge outline of the first fiducial marker; and determining whether the expected edge outline of the first fiducial marker matches the captured edge outline of the first fiducial marker within an accepted tolerance threshold.

Example 20 is a method as in any of Examples 1-19, further comprising: identifying a printed area of the coverslip; and optimizing a scan area for a sample covered by the coverslip based on the printed area of the coverslip; wherein the scan area is optimized based on one or more of scan time, scan file size, or test sensitivity.

Example 21 is a method. The method includes identifying a fiducial marker printed on a surface of a slide and focusing an optical microscope on the fiducial marker to calculate a focal distance of the fiducial marker. The method includes calculating a reference focal surface defining the surface of the slide based on the focal distance of the fiducial marker.

Example 22 is a method as in Example 21, wherein: the fiducial marker is printed on a top surface of the slide relative to an eyepiece or camera of the optical microscope, such that the top surface of the slide is in contact with a sample; the reference focal surface defining the surface of the slide defines the top surface of the slide; and the reference focal surface defining the top surface of the slide further defines a bottom surface of the sample relative to the eyepiece or the camera of the optical microscope.

Example 23 is a method as in any of Examples 21-22, further comprising: scanning the slide with the optical microscope to generate an overview scan; identifying a plurality of fiducial markers printed on the surface of the slide based on the overview scan; calculating a quantity of fiducial markers printed on the surface of the slide based on the overview scan; and identifying a location of each of the plurality of fiducial markers printed on the slide based on the overview scan.

Example 24 is a method as in any of Examples 21-23, wherein calculating the reference focal surface defining the surface of the slide comprises: focusing the optical microscope on each of the plurality of fiducial markers printed on the slide to calculate a focal distance for each of the plurality of fiducial markers; matching the focal distance for each of the plurality of fiducial markers with a corresponding location for each of the plurality of fiducial markers; and calculating the reference focal surface based on the corresponding focal distance and location of each of the plurality of fiducial markers.

Example 25 is a method as in any of Examples 21-24, wherein calculating the reference focal surface further comprises: interpolating focal distances for space between two or more fiducial markers based on focal distances for the two or more fiducial markers; and extrapolating the focal distance for a certain fiducial marker of the plurality of fiducial markers to estimate focal distances for an area surrounding the certain fiducial marker.

Example 26 is a method as in any of Examples 21-25, wherein calculating the reference focal surface further comprises: identifying three fiducial markers of the plurality of fiducial markers; identifying focal distances for each of the three fiducial markers; identifying locations for each of the three fiducial markers relative to the overview scan; and fitting planes to triangles defined by the three fiducial markers based at least in part on the focal distances and the locations for each of the three fiducial markers.

Example 27 is a method as in any of Examples 21-26, wherein calculating the reference focal surface further comprises: identifying four or more fiducial markers of the plurality of fiducial markers; identifying (x,y,z) coordinates for each of the four or more fiducial markers based on focal distances for each of the four or more fiducial markers and locations of each of the four or more fiducial markers relative to the overview scan; and fitting curved surfaces to points defined by the (x,y,z) coordinates of each of the four or more fiducial markers to generate a surface topology approximating the entire surface of the slide.

Example 28 is a method as in any of Examples 21-27, wherein the fiducial marker is printed on a top surface of the slide relative to an eyepiece or camera of the optical microscope, such that the top surface is in contact with a sample, and wherein the method further comprises: calculating a predicted focal distance to the sample based on results of the focusing of the optical microscope on one or more fiducial markers; and refining focus on the sample by testing a threshold range of focal distances that are greater than the predicted focal distance to the sample and/or less than the predicted focal distance to the sample.

Example 29 is a method as in any of Examples 21-28, further comprising: scanning the slide with the optical microscope to generate an overview scan; identifying the fiducial marker within the overview scan; calculating a z-axis location of the fiducial marker based on the focal distance to the fiducial marker; and calculating an x-axis and a y-axis location of the fiducial marker based on a location of the fiducial marker relative to the overview scan.

Example 30 is a method as in any of Examples 21-29, further comprising preparing a sample for imaging with the optical microscope by placing the sample on the slide using a sample transfer tool, wherein the sample transfer tool comprises: an elongated member; an outer loop defining an interior space; and one or more spokes attached to the outer loop and disposed within the interior space of the outer loop; wherein at least one spoke of the one or more spokes and at least a portion of the outer loop define a sample capture loop for capturing the sample; and wherein the elongated member is approximately normal to the one or more spokes.

Example 31 is a method as in any of Examples 21-30, further comprising identifying a chiral indicator on the slide and determining the orientation of the slide based on the chiral indicator.

Example 32 is a method as in any of Examples 21-31, wherein the fiducial marker is printed on a top surface of the slide relative to an eyepiece or camera of the optical microscope, such that the top surface is in contact with a sample, and wherein the method further comprises locating a particle of interest within the sample by focusing the optical microscope on a predicted particle height, wherein the predicted particle height is an estimated vertical distance where the particle is located in the sample relative the top surface of the slide.

Example 33 is a method as in any of Examples 21-32, wherein focusing the optical microscope on the predicted particle depth comprises determining the predicted particle depth relative to the optical microscope based on the reference focal surface.

Example 34 is a method as in any of Examples 21-33, further comprising: receiving an image of the slide captured by a camera associated with the optical microscope; assessing the image to determine if a fiducial marker is captured in the image; in response to no fiducial marker being visible in the image, altering a field of view for the camera associated with the optical microscope; receiving a new image of the slide captured by the camera with the altered field of view; and assessing the new image to determine if a fiducial marker is captured in the image.

Example 35 is a method as in any of Examples 21-34, further comprising, in response to a fiducial marker being captured in the image and/or the new image: assessing the image and/or the new image to determine whether an entirety of the captured fiducial marker is present in the image and/or the new image or a portion of the captured fiducial marker is present in the image and/or the new image; in response to only a portion of the captured fiducial marker being present in the image and/or the new image, identifying a captured edge outline of the captured fiducial marker; retrieving from memory an expected edge outline of the captured fiducial marker based on an overview image of the slide comprising all fiducial markers; and comparing the captured edge outline with the expected edge outline to calculate an estimated direction and distance required to move a stage or an objective of the optical microscope such that the entirety of the captured fiducial marker is present in a field of view of the optical microscope.

Example 36 is a method as in any of Examples 21-35, further comprising: causing the stage and/or the objective of the optical microscope to move according to the estimated direction and distance; determining (x,y) coordinates for the stage and/or the objective of the microscope after movement; and storing in memory an (x,y) coordinate of the captured fiducial marker based on the (x,y) coordinates of the stage and/or the objective.

Example 37 is a method as in any of Examples 21-36, further comprising, in response to a fiducial marker being captured in the image and/or the new image: assessing the image and/or the new image to determine whether an entirety of the field of view is covered by the captured fiducial marker; in response to only a portion of the field of view being covered by the captured fiducial marker, identifying a captured edge outline of the captured fiducial marker; retrieving from memory an expected edge outline of the captured fiducial marker based on an overview image of the slide comprising all fiducial markers; and comparing the captured edge outline with the expected edge outline to calculate an estimated direction and distance required to move a stage or an objective of the optical microscope such that the entirety of the field of view of the optical microscope is covered by the fiducial marker.

Example 38 is a method as in any of Examples 21-37, further comprising: causing the stage and/or the objective of the optical microscope to move according to the estimated direction and distance; determining (x,y) coordinates for the stage and/or the objective of the microscope after movement; and storing in memory an (x,y) coordinate of the captured fiducial marker based on the (x,y) coordinates of the stage and/or the objective.

Example 39 is a method as in any of Examples 21-38, further comprising: retrieving from memory an expected edge outline of a first fiducial marker printed on the slide based on an overview image comprising all fiducial markers printed on the slide; identifying a captured edge outline of the first fiducial marker based on an image captured with the optical microscope; comparing the expected edge outline of the first fiducial marker with the captured edge outline of the first fiducial marker; and determining whether the expected edge outline of the first fiducial marker matches the captured edge outline of the first fiducial marker within an accepted tolerance threshold.

Example 40 is a method as in any of Examples 21-39, further comprising: identifying a printed area of the slide; and optimizing a scan area for a sample disposed on the slide based on the printed area of the slide; wherein the scan area is optimized based on one or more of scan time, scan file size, or test sensitivity.

Example 41 is an apparatus. The apparatus includes an elongated member and an outer loop defining an interior space. The apparatus includes one or more spokes attached to the outer loop and disposed within the interior space defined by the outer loop.

Example 42 is an apparatus as in Example 41, wherein at least one spoke of the one or more spokes and at least a portion of the outer loop define a sample capture loop. The sample capture loop defines an empty interior space wherein a liquid sample can be captured by way of surface tension forces.

Example 43 is an apparatus as in any of Examples 41-42, wherein the elongated member is approximately normal to the one or more spokes.

Example 44 is an apparatus as in any of Examples 41-43, wherein at least one of the one or more spokes is attached to the elongated member.

Example 45 is an apparatus as in any of Examples 41-44, wherein one or more of the outer loop or the one or more spokes comprises ribbing.

Example 46 is a method. The method includes preparing a sample for imaging with an optical microscope by picking up a sample with the apparatus of any of Examples 41-45.

Example 47 is a method as in Example 46, wherein picking up the sample comprises touching a top surface of a solution disposed within a test tube with the outer surface of the apparatus of any of Examples 41-45.

Example 48 is a method as in any of Examples 46-47, wherein picking up the sample comprises touching a meniscus of the sample disposed within a test tube with the outer surface of the apparatus of any of Examples 41-45.

Example 49 is a method as in any of Examples 46-48, further comprising transferring the sample to a slide for imaging with an optical microscope by tapping the outer loop of the apparatus on the slide.

Example 50 is a method as in any of Examples 46-49, further comprising selecting an apparatus as in any of Examples 41-45 based on a number of spokes in the apparatus, wherein the number of spokes is selected based on one or more of number of particles in the sample, size of particles in the sample, predicted particle depth of particles in the sample, and so forth.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the claims, if any.

What is claimed is:

1. A method for locating a position of a sample to be visualized with an optical microscope, the method comprising:

capturing an overview image of a slide underneath the sample by imaging the slide with a camera, wherein the overview image depicts an entirety of the slide;

identifying a fiducial marker captured in the overview image by processing the overview image with one or more computer-executed programs, wherein the fiducial marker is printed on a surface of the slide;

in response to identifying the fiducial marker in the overview image, determining x-axis coordinates and y-axis coordinates indicating a location of the fiducial marker;

focusing the optical microscope on the fiducial marker;

in response to focusing the optical microscope on the fiducial marker, calculating a focal distance of the fiducial marker, wherein the focal distance is a z-axis coordinate indicating the location of the fiducial marker; and calculating with the one or more computer-executed programs a reference focal surface defining the surface of the slide based at least in part on the x-axis coordinates, y-axis coordinates, and z-axis coordinates indicating the location of the fiducial marker.

2. The method of claim 1, wherein:
the fiducial marker is printed on a top surface of the slide relative to an eyepiece or camera of the optical microscope, such that the top surface is in contact with the sample;
the reference focal surface defines the top surface of the slide; and
the reference focal surface defining the top surface of the slide further defines a bottom surface of the sample relative to the eyepiece or the camera of the optical microscope.

3. The method of claim 1, wherein the fiducial marker comprises a plurality of fiducial markers, and wherein the method further comprises:
identifying each of the plurality of fiducial markers captured in the overview image with the one or more computer-executed programs;
calculating a quantity of the plurality of fiducial markers identified in the overview image; and
for each of the plurality of fiducial markers identified in the overview image, determining unique x-axis coordinates and y-axis coordinates indicating a unique location for each of the plurality of fiducial markers;
wherein calculating the reference focal surface comprises calculating based on the unique x-axis coordinates and y-axis coordinates of each of the plurality of fiducial markers.

4. The method of claim 3, wherein calculating the reference focal surface defining the surface of the slide comprises:
focusing the optical microscope on each of the plurality of fiducial markers;
calculating a focal distance for each of the plurality of fiducial markers, wherein the focal distance is a unique z-axis coordinate indicating the location of each of the plurality of fiducial markers;
calculating the reference focal surface based on unique x-axis coordinates, y-axis coordinates, and z-axis coordinates for each of the plurality of fiducial markers.

5. The method of claim 4, wherein calculating the reference focal surface further comprises:
interpolating focal distances for space between two or more fiducial markers based on focal distances for the two or more fiducial markers; and
extrapolating the focal distance for a certain fiducial marker of the plurality of fiducial markers to estimate focal distances for an area surrounding the certain fiducial marker.

6. The method of claim 4, wherein calculating the reference focal surface further comprises:
identifying three fiducial markers of the plurality of fiducial markers;
identifying z-axis coordinates for each of the three fiducial markers based on focal distances for each of the three fiducial markers;
identifying x-axis coordinates and y-axis coordinates indicating locations for each of the three fiducial markers based on the overview image; and
calculating a plane of a triangle defined by the three fiducial markers based at least in part on the x-axis coordinates, y-axis coordinates, and z-axis coordinates for each of the three fiducial markers.

7. The method of claim 4, wherein calculating the reference focal surface further comprises:

identifying four or more fiducial markers of the plurality of fiducial markers;
identifying unique x-axis coordinates and y-axis coordinates indicating locations for each of the four or more fiducial markers based on the overview image;
calculating unique z-axis coordinates for each of the four fiducial markers based on a focal distance for each of the four or more fiducial markers;
fitting curved surfaces to points defined by the unique x-axis coordinates, y-axis coordinates, and z-axis coordinates of each of the four or more fiducial markers to generate a surface topology approximating the entirety of the slide.

8. The method of claim 1, wherein the fiducial marker is printed on a top surface of the slide relative to an eyepiece or camera of the optical microscope, such that the top surface is in contact with the sample, and wherein the method further comprises:
calculating a predicted sample focal distance for focusing on the sample with the camera of the optical microscope, wherein calculating the predicted sample focal distance comprises predicting to based on the z-axis coordinate of the fiducial marker; and
refining focus on the sample by testing a threshold range of focal distances that are greater than the predicted focal distance to the sample and/or less than the predicted focal distance to the sample.

9. The method of claim 1, further comprising preparing a sample for imaging with the optical microscope by placing the sample on a slide using a sample transfer tool, wherein the sample transfer tool comprises:
an elongated member;
an outer loop defining an interior space; and
one or more spokes attached to the outer loop and disposed within the interior space of the outer loop;
wherein at least one spoke of the one or more spokes and at least a portion of the outer loop define a sample capture loop for capturing the sample; and
wherein the elongated member is approximately normal to the one or more spokes.

10. The method of claim 1, further comprising:
identifying a chiral indicator on the slide by processing the overview image with the one or more computer-executed programs; and
determining an orientation of the slide based on an orientation of the chiral indicator.

11. The method of claim 1, wherein the fiducial marker is printed on a top surface of the slide relative to an eyepiece or camera of the optical microscope, such that the top surface is in contact with the sample, and wherein the method further comprises locating a particle of interest within the sample by focusing the optical microscope on a predicted particle depth, wherein the predicted particle depth is an estimated depth where the particle is located in the sample relative the top surface of the slide.

12. The method of claim 11, wherein focusing the optical microscope on the predicted particle depth comprises calculating the predicted particle depth relative to the optical microscope based at least on the reference focal surface.

13. The method of claim 1, further comprising:
receiving the overview image of the slide captured by the camera;
assessing the overview image to detect whether the fiducial marker is captured in the overview image;
in response to failing to detect the fiducial marker in the overview image, altering a field of view for the camera;

receiving a new overview image of the slide captured by the camera with the altered field of view; and assessing the new overview image to detect whether the fiducial marker is captured in the new overview image.

14. The method of claim 13, further comprising, in response to detecting the fiducial marker in one or more of the overview image or the new overview image:

assessing the one or more of the overview image of the new overview image to determine whether an entirety of the fiducial marker is depicted in the one or more of the overview image or the new overview image;

in response to only a portion of the fiducial marker being detected present in the one or more of the overview image or the new overview image, identifying a captured edge outline of the fiducial marker;

retrieving from memory an expected edge outline of the fiducial marker based on a stored overview image of the slide comprising all fiducial markers; and comparing the captured edge outline with the expected edge outline to calculate an estimated direction and distance required to move a stage or an objective of the optical microscope such that the entirety of the fiducial marker is present in a field of view of the optical microscope.

15. The method of claim 14, further comprising:

causing the stage and/or the objective of the optical microscope to move according to the estimated direction and distance; and determining (x,y) coordinates for the stage and/or the objective of the optical microscope after movement.

16. The method of claim 13, further comprising, in response to detecting the fiducial marker in the one or more of the overview image or the new overview image:

assessing the one or more of the overview image or the new overview image to determine whether an entirety of the field of view is covered by the fiducial marker;

in response to only a portion of the field of view being covered by the fiducial marker, identifying a captured edge outline of the fiducial marker;

retrieving from memory an expected edge outline of the fiducial marker based on a stored overview image of the slide comprising all fiducial markers; and comparing the captured edge outline with the expected edge outline to calculate an estimated direction and distance required to move a stage or an objective of the optical microscope such that the entirety of the field of view of the optical microscope is covered by the fiducial marker.

17. The method of claim 16, further comprising:

causing the stage and/or the objective of the optical microscope to move according to the estimated direction and distance; and determining (x,y) coordinates for the stage and/or the objective of the optical microscope after movement.

18. The method of claim 1, further comprising:

retrieving from memory an expected edge outline of a first fiducial marker printed on the slide based on a stored overview image comprising all fiducial markers printed on the slide;

identifying a captured edge outline of the first fiducial marker based on the overview image captured by the camera;

comparing the expected edge outline of the first fiducial marker with the captured edge outline of the fiducial marker; and determining whether the expected edge outline of the first fiducial marker matches the captured edge outline of the fiducial marker within an accepted tolerance threshold.

19. The method of claim 1, further comprising:

identifying a printed area of the slide captured in the overview image by processing the overview image with the one or more computer-executed programs; and optimizing a scan area for the sample covered by the slide based on the printed area of the slide;

wherein the scan area is optimized based on one or more of scan time, scan file size, or test sensitivity.

20. The method of claim 1, wherein the slide comprises a plurality of fiducial markers printed thereon, and wherein the method further comprises processing the overview image with the one or more computer-executed programs to determine whether each of the plurality of fiducial markers is depicted in the overview image.

* * * * *

UNITED STATES PATENT AND TRADEMARK OFFICE
CERTIFICATE OF CORRECTION

PATENT NO. : 11,994,662 B2
APPLICATION NO. : 16/746633
DATED : May 28, 2024
INVENTOR(S) : Cahoon et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 809 days.

Signed and Sealed this
Sixth Day of January, 2026

John A. Squires
*Director of the United States Patent and Trademark Office*